United States Patent
Chen et al.

(10) Patent No.: US 12,490,115 B2
(45) Date of Patent: Dec. 2, 2025

(54) DIRECTIONAL CHANNEL OCCUPANCY MONITORING FOR SPECTRUM SHARING

(71) Applicant: QUALCOMM Incorporated, San Diego, CA (US)

(72) Inventors: Siyi Chen, Beijing (CN); Arumugam Chendamarai Kannan, San Diego, CA (US); Changlong Xu, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 261 days.

(21) Appl. No.: 18/254,424

(22) PCT Filed: Jan. 12, 2021

(86) PCT No.: PCT/CN2021/071214
§ 371 (c)(1),
(2) Date: May 25, 2023

(87) PCT Pub. No.: WO2022/150952
PCT Pub. Date: Jul. 21, 2022

(65) Prior Publication Data
US 2023/0370864 A1    Nov. 16, 2023

(51) Int. Cl.
*H04W 16/14* (2009.01)
*H04B 7/06* (2006.01)
(Continued)

(52) U.S. Cl.
CPC ........ *H04W 16/28* (2013.01); *H04B 7/06952* (2023.05); *H04W 16/14* (2013.01); *H04W 74/0808* (2013.01)

(58) Field of Classification Search
CPC . H04W 16/28; H04W 16/14; H04W 74/0808; H04W 88/08; H04W 48/16;
(Continued)

(56) References Cited

U.S. PATENT DOCUMENTS

| | | | |
|---|---|---|---|
| 10,368,301 B2 | 7/2019 | Chendamarai et al. | |
| 2018/0070242 A1* | 3/2018 | Damnjanovic | H04W 74/0808 |

(Continued)

FOREIGN PATENT DOCUMENTS

| | | |
|---|---|---|
| CN | 110535548 A | 12/2019 |
| WO | 2018151898 A1 | 8/2018 |
| WO | 2018156280 | 8/2018 |

OTHER PUBLICATIONS

International Search Report and Written Opinion—PCT/CN2021/071214—ISA/EPO—Oct. 14, 2021.
(Continued)

*Primary Examiner* — Kenneth T Lam
(74) *Attorney, Agent, or Firm* — Harrity & Harrity

(57) ABSTRACT

Mechanisms for directional channel occupancy monitoring for a frequency band among multiple networks are provided. In one aspect, a method of wireless communication includes monitoring, in a shared frequency band in a plurality of beam directions, for signals associated with one or more wireless networks different from the first wireless network. The monitoring includes: detecting, in the shared frequency band and in at least a first beam direction of the plurality of beam directions, a first signal associated with a second wireless network; and up-dating a channel occupancy list to indicate that at least a portion of the shared frequency band is occupied in at least the first beam direction. The method also includes transmitting, in the shared frequency band, a second signal in a second beam direction of the plurality of beam directions based on the channel occupancy list.

30 Claims, 13 Drawing Sheets

(51) Int. Cl.
*H04W 16/28* (2009.01)
*H04W 74/0808* (2024.01)

(58) Field of Classification Search
CPC .............. H04W 72/1268; H04W 72/21; H04B 7/06952; H04B 7/088; Y02D 30/70
See application file for complete search history.

(56) References Cited

U.S. PATENT DOCUMENTS

| | | | |
|---|---|---|---|
| 2018/0098335 A1* | 4/2018 | Sun | H04B 7/2687 |
| 2018/0242184 A1* | 8/2018 | Yerramalli | H04W 16/18 |
| 2018/0242232 A1* | 8/2018 | Chendamarai Kannan | H04L 5/005 |
| 2019/0059001 A1* | 2/2019 | Yerramalli | H04W 16/14 |
| 2019/0090279 A1 | 3/2019 | Sun et al. | |
| 2019/0104416 A1* | 4/2019 | Yerramalli | H04W 72/51 |
| 2020/0252806 A1 | 8/2020 | Yerramalli et al. | |
| 2022/0174512 A1* | 6/2022 | Rune | H04W 24/10 |

OTHER PUBLICATIONS

Supplementary Partial European Search Report—EP21918171—Search Authority—Munich—Sep. 20, 2024.
Supplementary European Search Report—EP21918171—Search Authority—Munich—Jan. 24, 2025.

* cited by examiner

DIRECTIONAL CHANNEL OCCUPANCY MONITORING FOR SPECTRUM SHARING

CROSS-REFERENCE TO RELATED APPLICATIONS

The present application is a 35 U.S.C. 371 National Phase entry of Patent Cooperation Treaty (PCT) Application No. PCT/CN2021/071214, filed Jan. 12, 2021, which is hereby expressly incorporated herein by reference in its entirety.

TECHNICAL FIELD

This application relates to wireless communication systems, and more particularly to directional channel occupancy monitoring for a frequency band among multiple networks.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In some instances, multiple 5G NR networks may operate in overlapping areas and in shared frequency bands, including mmWave bands. Devices operating in mmWave bands, such as BSs, may use directional beamforming to focus transmitted and/or received signal energy in each of a plurality of beam directions. In this regard, wireless communication in the mmWave bands is particularly susceptible to signal loss and attenuation from the air. Accordingly, beam-based directional communication can improve the efficiency of wireless communication systems. However, the devices of different spatially co-located networks may experience communication collisions and interference from the devices of the other network. These collisions can result in failed data transmissions and reduce the efficiency of the network.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One aspect of the present disclosure includes a method of wireless communication performed by a base station (BS) associated with a first wireless network. The method of wireless communication includes monitoring, in a shared frequency band in a plurality of beam directions, for signals associated with one or more wireless networks different from the first wireless network, where the monitoring may include detecting, in the shared frequency band and in at least a first beam direction of the plurality of beam directions, a first signal associated with a second wireless network; and updating a channel occupancy list to indicate that at least a portion of the shared frequency band is occupied in at least the first beam direction. The method also includes transmitting, in the shared frequency band, a second signal in a second beam direction of the plurality of beam directions based on the channel occupancy list.

One aspect of the present disclosure includes a method of wireless communication performed by a user equipment (UE). The method of wireless communication includes receiving, from a base station (BS) associated with a first wireless network, a channel occupancy sensing configuration. The method also includes monitoring, in a shared frequency band in a plurality of beam directions, for signals associated with one or more second wireless networks different from the first wireless network, where the monitoring is based on the channel occupancy sensing configuration. The method also includes transmitting, to the BS, a first wireless communication indicating that the shared frequency band is available for communications in the first wireless network in one or more beam directions of the plurality of beam directions.

One aspect of the present disclosure includes a base station (BS) associated with a first wireless network. The BS includes a processor configured to: monitor, in a shared frequency band in a plurality of beam directions, for signals associated with one or more wireless networks different from the first wireless network, where the processor configured to monitor may include detect, in the shared frequency band and in at least a first beam direction of the plurality of beam directions, a first signal associated with a second wireless network; and update a channel occupancy list to indicate that at least a portion of the shared frequency band is occupied in at least the first beam direction. The BS also includes a transceiver configured to transmit, in the shared frequency band, a second signal in a second beam direction of the plurality of beam directions based on the channel occupancy list.

One aspect of the present disclosure includes a user equipment (UE). The UE includes a transceiver configured to receive, from a base station (BS) associated with a first wireless network, a channel occupancy sensing configuration. The UE also includes a processor configured to monitor, in a shared frequency band in a plurality of beam directions, for signals associated with one or more second wireless networks different from the first wireless network, where the processor configured to monitor is based on the channel occupancy sensing configuration. The transceiver is further configured to transmit, to the BS, a first wireless communication indicating that the shared frequency band is available for communications in the first wireless network in one or more beam directions of the plurality of beam directions.

One aspect of the present disclosure includes a non-transitory, computer-readable medium having program code recorded thereon. The program code includes code for causing a base station (BS) associated with a first wireless network to monitor, in a shared frequency band in a plurality of beam directions, for signals associated with one or more wireless networks different from the first wireless network, where the code for causing the BS to monitor includes: code for causing the BS to detect, in the shared frequency band and in at least a first beam direction of the plurality of beam directions, a first signal associated with a second wireless network; and code for causing the BS to update a channel occupancy list to indicate that at least a portion of the shared frequency band is occupied in at least the first beam direction. The program code also includes code for causing the BS to transmit, in the shared frequency band, a second signal in a second beam direction of the plurality of beam directions based on the channel occupancy list.

One aspect of the present disclosure includes a non-transitory, computer-readable medium having program code recorded thereon. The program code includes code for causing a user equipment (UE) to receive, from a base station (BS) associated with a first wireless network, a channel occupancy sensing configuration. The program code also includes code for causing the UE to monitor, in a shared frequency band in a plurality of beam directions, for signals associated with one or more second wireless networks different from the first wireless network, where the code for causing the UE to monitor includes code for causing the UE to monitor based on the channel occupancy sensing configuration. The program code also includes code for causing the UE to transmit, to the BS, a first wireless communication indicating that the shared frequency band is available for communications in the first wireless network in one or more beam directions of the plurality of beam directions.

One aspect of the present disclosure includes a base station (BS) associated with a first wireless network. The BS includes means for monitoring, in a shared frequency band in a plurality of beam directions, for signals associated with one or more wireless networks different from the first wireless network, where the means for monitoring may include means for detecting, in the shared frequency band and in at least a first beam direction of the plurality of beam directions, a first signal associated with a second wireless network; and means for updating a channel occupancy list to indicate that at least a portion of the shared frequency band is occupied in at least the first beam direction. The BS also includes means for transmitting, in the shared frequency band, a second signal in a second beam direction of the plurality of beam directions based on the channel occupancy list.

One aspect of the present disclosure includes a user equipment (UE). The user equipment includes means for receiving, from a base station (BS) associated with a first wireless network, a channel occupancy sensing configuration. The UE also includes means for monitoring, in a shared frequency band in a plurality of beam directions, for signals associated with one or more second wireless networks different from the first wireless network, where the monitoring is based on the channel occupancy sensing configuration. The UE also includes means for transmitting, to the BS, a first wireless communication indicating that the shared frequency band is available for communications in the first wireless network in one or more beam directions of the plurality of beam directions.

Other aspects and features of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
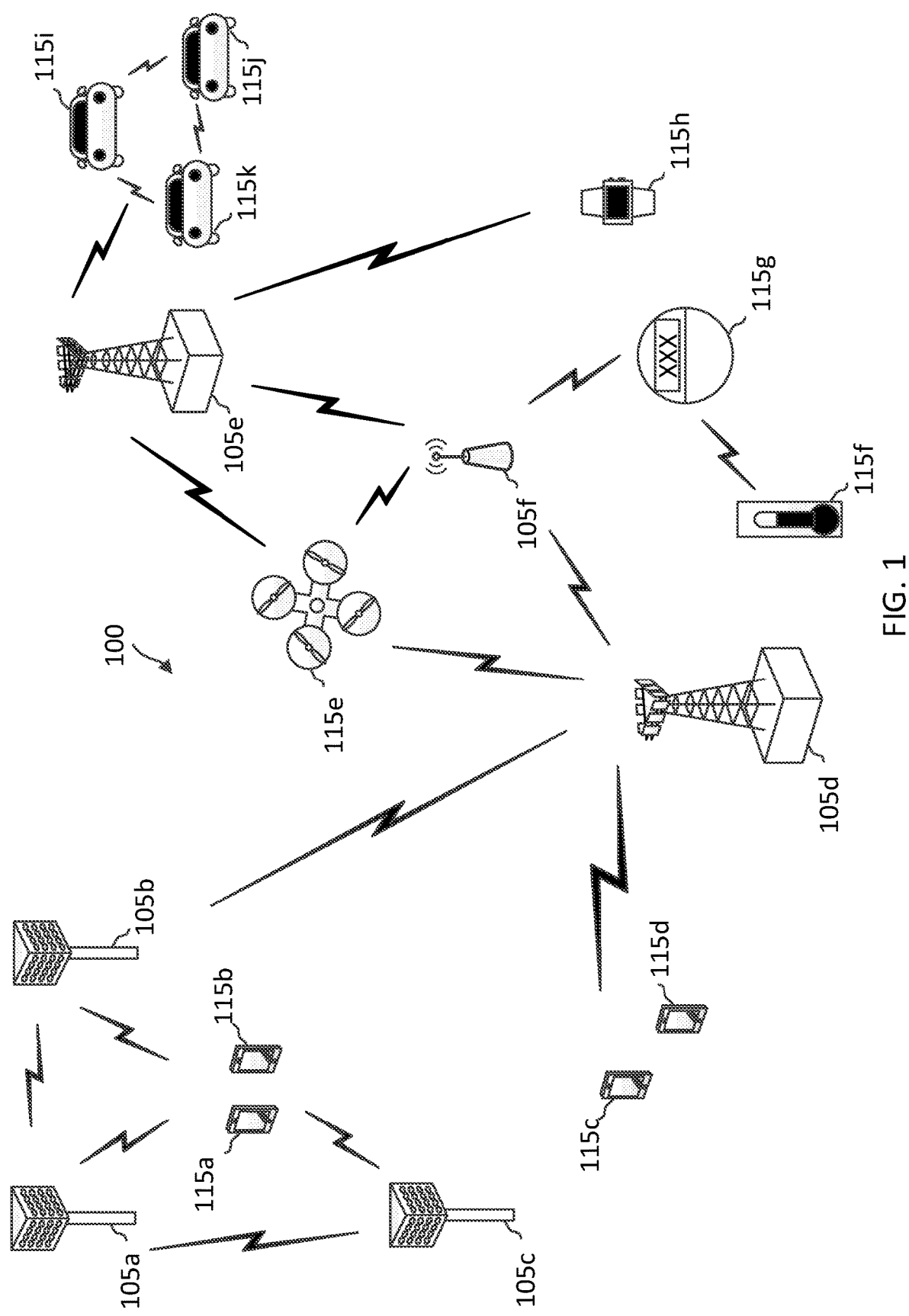
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

A wireless network may use directional beamforming to transmit and/or receive wireless communications. Directional beamforming can reduce the occurrence of collisions or interference between devices of different networks. Further, directional beamforming can increase the power efficiency of wireless communication systems. For example, in the mmWave spectrum, wireless communications are particularly susceptible to signal loss and attenuation by the interaction of the radio signals and the air. Directional beamforming allows the energy to be focused in a given direction to increase the signal-to-noise ratio (SNR) of the signal at the receiving device. Due to the reduced propagation of radio signals in these frequencies, wireless networks operating in the mmWave spectrum may include several BSs within a relatively small geographical area. Additionally, there may be more than one network operating in the mmWave spectrum in the geographic area. Although directional beamforming may reduce the chance of a collision due to their directional nature, it is still possible that one or more wireless communication devices within a network experience collisions or interference from the devices of another wireless network.

The present disclosure describes mechanisms for channel occupancy monitoring to reduce the occurrence of collisions between networks operating over a shared frequency band. In particular, the mechanisms described herein may be performed to reduce the occurrence of collisions between networks having a same priority in accessing resources in the shared frequency band. For example, a directional channel occupancy monitoring scheme may include a first BS associated with a first network monitoring for signals in a shared frequency band and in a plurality of beam directions, and updating a non-occupancy list to indicate which beam directions and/or subbands of a shared frequency band are available or occupied. Based on the non-occupancy list, the first BS may determine which beam directions and/or frequency subbands can be used for a period of time. For example, the first BS may refrain from communicating in the shared frequency band for any beam direction which the non-occupancy list indicates is occupied. In other aspects, the first BS may proceed to communicate in the occupied beam directions in the shared frequency band, but using a reduced transmit power and/or duty cycle. In some aspects, the first BS may determine whether to refrain from communicating in a shared frequency band or subband for all beam directions by comparing the number of occupied beam directions to a threshold number of beam directions.

Further, the present disclosure describes mechanisms for UE-assisted channel occupancy monitoring, which includes configuring the UEs of a first network to monitor for signals during one or more sensing windows. In some aspects, the UEs may be configured to indicate, to a BS of the same network, the available and occupied beam directions and/or the available and occupied frequency subbands of the shared frequency band.

The mechanisms described herein advantageously reduce collisions between wireless devices of different networks in a directional communication scenario. The non-occupancy list allows a wireless communication device monitoring for signals indicating channel occupancy to make per-beam and/or per-channel decisions for communicating in a shared frequency band to reduce or avoid collisions while still using available shared channel resources. Accordingly, more efficient use of time and frequency resources is provided.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames.

A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL subframe in an UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate an UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. AN UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, an UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as channel occupancy time (COT). For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. An LBT may include one, two, or more clear channel assessments (CCAs) performed during successive time periods. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random back-off period. For instance, a transmitting node may determine a channel measurement in a time interval and determine whether the channel is available or not based on a comparison of the channel measurement against a ED threshold. A CAT4 LBT refers to an LBT with a random back-off and a variable contention window (CW). For instance, a transmitting node may draw a random number and back-off for a duration based on the drawn random number in a certain time unit.

In mmWave, wireless nodes (e.g., BSs, UEs) may use directional beamforming to focus signal energy in each of a plurality of beam directions. Accordingly, probability of collisions may be relatively lower than non-directional wireless communication, such as wireless communications in the sub-7 GHz bands. Further, LBT procedures may not focus received signal energy directionally, and thus the probability of detecting interference in the mmWave over a given threshold is further reduced. Although directional (beam-based) LBT may be used to monitor for traffic and interference on a shared frequency band in a plurality of beam directions, the overhead of these LBT procedures may be excessive in comparison to the low occurrence of collisions between networks operating in mmWave bands. However, it is still possible for collisions in directional mmWave frequency bands between networks. Thus, it may still be desirable to provide a mechanism which avoids interference collisions between wireless networks with less overhead than directional LBT mechanisms.

Figure 2:
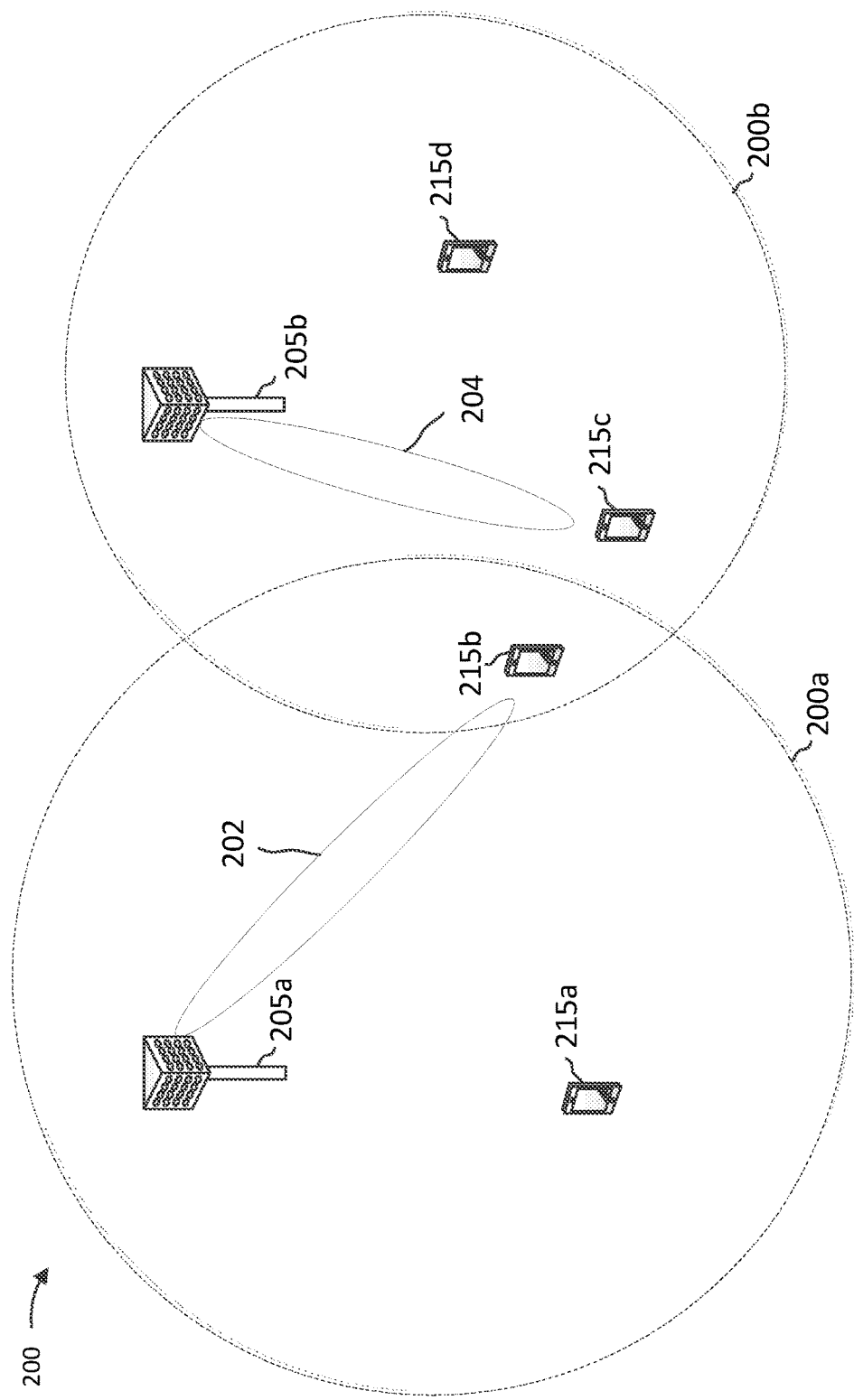
FIG. 2 illustrates a directional wireless communication scenario including a first wireless network and a second wireless network, according to aspects of the present disclosure.

FIG. 2 illustrates a directional wireless communication scenario 200 including a first wireless network 200a and a second wireless network 200b, according to aspects of the present disclosure. The first wireless network 200a and second wireless network 200b may be similar or identical to the wireless network 100 shown in FIG. 1. For example, the wireless network 200a includes a BS 205 a, a first UE 215a, and a second UE 215b. The second wireless network 200b includes a second BS 205b, a third UE 215c, and a fourth UE 215d. In some aspects, the first wireless network 200a may be associated with a same priority as the second wireless network 200b. The scenario 200 illustrates a wireless communication collision occurring when a wireless node in one network (e.g., UE 215b) is within range of two or more BSs 205 belonging to other wireless networks (200b).

In FIG. 2, the first BS 205a is emitting a first signal 202 in a first beam direction toward the second UE 215b and the second BS 205b is emitting a second signal 204 in a second beam direction toward the third UE 215c. Because the second UE 215b and the third UE 215c are approximately in the direction and range of the first signal 202 and the second signal 204, the UEs 215b and 215c may experience a collision. The collisions may result in failed communication attempts, thereby degrading performance and efficiency. The scenario 200 may be more likely in directional wireless communication schemes in which beamforming is used to generate focused wireless signals having relatively narrow beam widths. For example, in 5G NR, beamforming may be used in the millimeter wave (mmWave) spectrum to compensate for signal loss attenuation in the air. Further, a network operating in the mmWave spectrum may include several wireless nodes or BSs with in a relatively close proximity. Accordingly, the wireless communication devices within a 5G NR network may experience interference as shown in FIG. 2.

In the scenario 200, the first wireless network 200a and the second network 200b are associated with a same priority. Accordingly, it may be desirable to provide a mechanism for resolving or preventing collisions in shared frequency bands that does not depend on determining the network's priority. Further, it may be desirable for one network to back off of one or more shared frequency bands for a significant amount of time, and for the network to back off on a per-beam and/or per-channel basis to reduce overhead and make more efficient use of network resources. The present disclosure describes systems, devices, methods, and mechanisms to reduce collisions between wireless networks using directional (e.g., beam-based) monitoring by updating a channel occupancy list, and using the channel occupancy list to determine which beams and channels are available for communication in a multiple network communication scenario.

Figure 3:
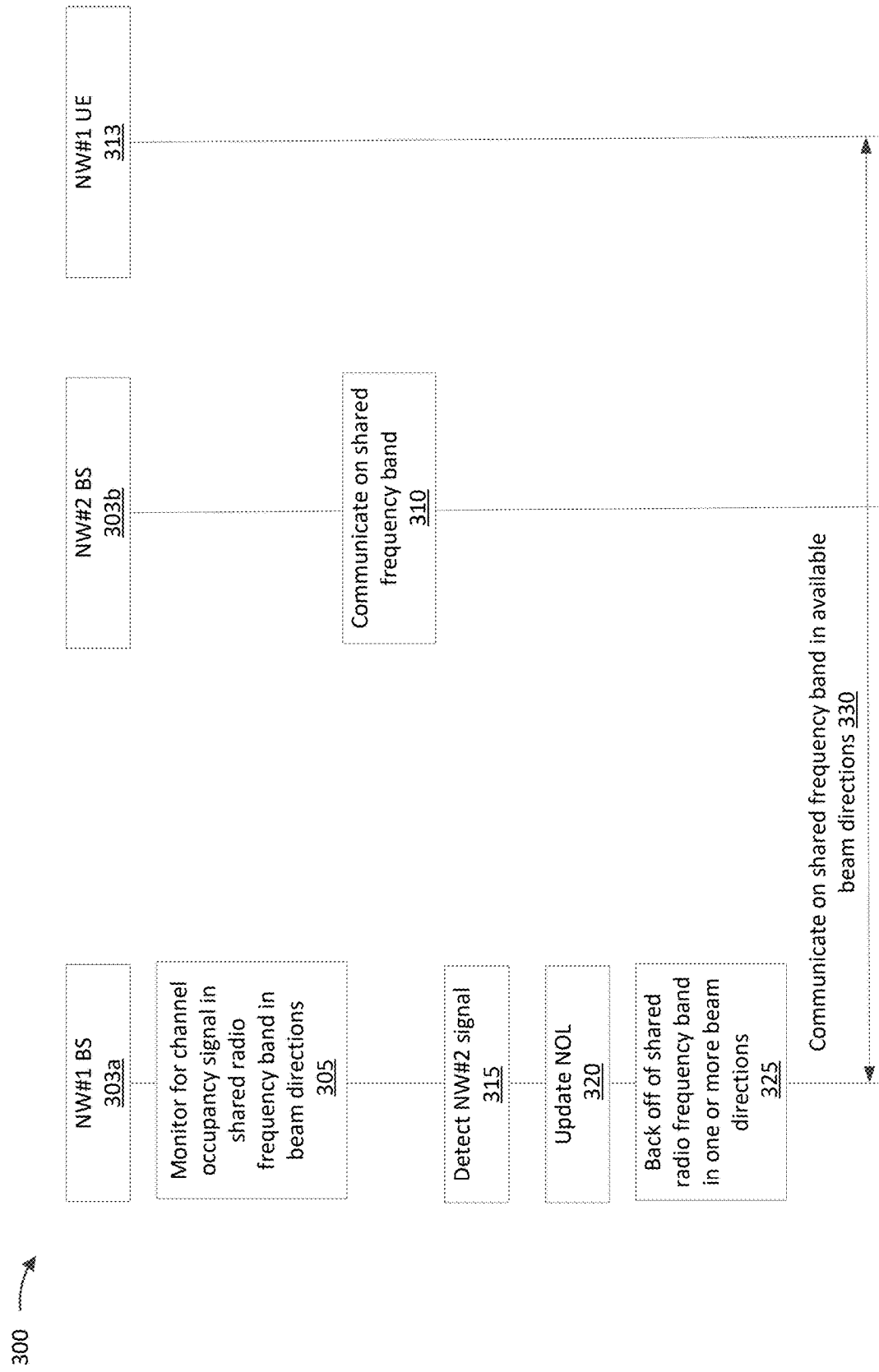
FIG. 3 is a signaling diagram illustrating a directional channel monitoring scheme according to aspects of the present disclosure.

FIG. 3 is a signaling diagram illustrating a directional channel occupancy monitoring scheme 300 according to aspects of the present disclosure. The scheme 300 may be performed by wireless networks, such as the networks 100, 200a, and 200b, sharing a radio frequency band (e.g., a mmWave band) for communications. In this regard, the scheme 300 is carried out by a second BS 303b associated with a first network (NW #1), a first BS 303a associated with a second network (NW #2), and a UE 313 associated with the first network. In some aspects, the first and second networks may be associated with a same or equal priority. The BSs 303a, 303b may include any of the BSs 105 shown in FIG. 1. In some aspects, the second BS 303b and/or the first BS 303a may utilize one or more components of the BS 1000, such as the processor 1002, the memory 1004, the channel occupancy module 1008, the transceiver 1010, the modem 1012, and the one or more antennas 1016, to execute the steps of the method 300. The UE 313 may include any of the UEs 115 shown in FIG. 1. The UE 313 may utilize one or more components of the UE 900, such as the processor 902, the memory 904, the Channel occupancy module 908, the transceiver 910, the modem 912, and the one or more antennas 916, to execute the steps of the method 300. The second BS 303b and the first BS 303a may be associated with different networks, such as the first network 200a and the second network 200b shown in FIG. 2. The first BS 303a and the second BS 303b may be positioned such that the first BS 303a is at least partially within range of wireless signals from the second BS 303b, and vice versa.

In action 305, the first BS 303a monitors for signals in the shared radio frequency band in each of a plurality of beam directions. The monitoring of action 305 may occur during a sensing window. The signals may be associated with network traffic from one or more other networks, such as the second network associated with the second BS 303b. The first BS 303a may be preconfigured with the parameters for the monitoring, such as the specific time and frequency resources associated with the sensing window. In some aspects, the sensing window may repeat in time, for example, periodically. The monitoring may include obtaining signal measurements during the sensing window, comparing the signal measurements to a threshold, and/or performing signal detection. Signal detection may include computing a cross-correlation between a signal received from the channel and a known channel occupancy waveform or sequence and comparing the cross-correlation to a threshold. A channel occupancy signal is detected when the cross-correlation exceeds the threshold. in order to detect the signal. The monitoring may be periodic such that the first BS 303a monitors for the signal at predetermined time intervals and for predetermined durations. Monitoring for the signals may include refraining from transmitting and/or receiving during the sensing window. The first BS 303a may presume that any transmission detected during the sensing window is coming from a wireless node (e.g., BS, UE) of a different network, such as the second network.

The first BS 303a may use beamforming to monitor for the signals in each of a plurality of beam directions. The beamforming may include selectively activating individual antenna elements and groups of antenna elements of an antenna array or antenna panels (e.g., MIMO), and adjusting the gain and phase of the signals provided by each antenna element to focus on each of a plurality of receive beam directions. The monitoring may be performed according to a beam pattern, such as a beam sweeping pattern in which the first BS 303a uses beamforming to sweep across a plurality of receive beam directions. The first BS 303a may monitor for the signals in a plurality of sensing windows spaced apart in time by an interval. In some aspects, the interval between individual sensing windows may be relatively large. For example, the period between sensing windows may be several seconds or several minutes, including values such as thirty seconds, forty-five seconds, one minute, two minutes, five minutes, ten minutes, thirty minutes, sixty minutes, and any other suitable value, both greater and smaller. The first BS 303a may be configured to monitor in each beam direction of the plurality of beam directions one or more times. For example, the first BS 303*a* may sweep through each of the plurality of beam directions two, three, four, five, or more times.

In action 310, the second BS 303*b* communicates on the shared frequency band which the first BS 303*a* is monitoring. Communicating on the shared frequency band may include using beamforming to transmit signals in each of a plurality of transmit beam directions such that the signal is associated with a beam having a beam width. For the purposes of the present disclosure, using beamforming to transmit signals in a focused direction or beam may be referred to as transmitting "a beam," where the beam is a spatially-focused signal associated with a beam direction and a beam width. Similarly, using beamforming to receive signals from specific beam directions may be referred to as receiving "a beam."

As similarly described above with respect action 305, the beamforming may include activating individual antenna elements, and adjusting the gain and phase of the signals emitted by the antenna elements such that the signal energy is focused in a particular direction. In the scheme 300 shown in FIG. 3, one or more signals transmitted by the second BS 303*b* in action 310 may be of a suitable intensity and beam direction such that the signals can be detected by the first BS 303*a*. The second BS 303*b* may be configured to transmit the signals according to a beam pattern, such as a beam sweeping pattern.

In action 315, the first BS 303*a* detects at least one signal transmitted by the second BS 303*b* on the shared frequency band. Detecting the signal may include performing signal measurements and/or signal detection (cross-correlation) during the sensing window, comparing the signal measurements to a threshold, and/or comparing a cross-correlation value to a signal detection threshold. In some aspects, the detection of the signal is based on the measured energy. For example, the first BS 303*a* may compare the measured energy to a signal threshold. If the measured energy exceeds the threshold, the first BS 303*a* determines that a signal has been detected.

In action 320, the first BS 303*a* updates a non-occupancy list (NOL) based on detecting the signal in action 315. The NOL is updated to indicate the beam direction(s) and frequency bands/subbands associated with the signal. For example, if the first BS 303*a* detects a signal in a first beam direction, and in a first frequency subband, the first BS 303*a* updates the NOL to indicate that at least the first frequency subband is occupied in at least the first beam direction. If the first BS 303*a* subsequently detects a further signal in a second beam direction and in a second frequency subband, the first BS 303*a* again updates the NOL to indicate that at least the second frequency subband is occupied in at least the second beam direction. Accordingly, the first BS 303*a* updates or maintains the NOL on a per-beam and per-channel basis. In this way, the first BS 303*a* can determine which resources to use in a way that reduces the chances of collisions with less overhead than some LBT procedures. In some aspects, the first BS 303*a* may store the NOL in a memory (e.g., the memory 1004 of FIG. 10) at the first BS 303*a*.

In action 325, based on the updated NOL, the first BS 303*a* backs off of the radio frequency band in at least a first beam direction associated with the signal for a predetermined amount of time. Backing off of the shared band may include refraining from communicating (transmitting or receiving) on the shared radio frequency band or at least the detected beam direction. In other aspects, the first BS 303*a* may not back off of communicating in the shared frequency band for the one or more occupied beams, but may continue communicating with the occupied beam directions using modified transmit power and/or duty cycle parameters. As explained below, in some aspects the first BS 303*a* may back off an entire bandwidth of the shared radio frequency band associated with the sensing window, or may back off of specific subbands of the shared radio frequency band. In this regard, the signal may span only a portion of the frequency band during the sensing window. For example, the shared radio frequency band may have a bandwidth of about 80 MHz partitioned into about four 20 MHz subbands, and a signal may be in a particular 20 MHz subband. In other aspects, such as in mmWave frequency bands, the shared radio frequency band may have a bandwidth of about 2 GHz partitioned into five 400 MHz subbands, and a signal may be in a particular 400 MHz subband. Accordingly, in some aspects, the first BS 303*a* may back off of those subbands in which the signal is detected. In other aspects, the first BS 303*a* determines whether to back off of the entire shared radio frequency band by comparing the total detected energy in the sensing window, or the number of beams or instances of the signal to a threshold. Backing off of the shared radio frequency band may include refraining from communicating on the shared radio frequency band, including transmitting and/or receiving on the shared radio frequency band.

In some aspects, the first BS 303*a* may not back off of the shared channel in the detected beam directions altogether, but may continue communicating in the shared frequency band and in the detected beam directions, but with reduced transmit power and/or duty cycle without completely surrendering the channel resources. Using a reduced transmit power and/or duty cycle can reduce the amount of interference to the other network having ongoing transmissions in the shared frequency band. Communicating in an occupied channel and beam direction with reduced transmit power and/or duty cycle is further described with respect to FIG. 5B.

In action 330, the first BS 303*a* and the UE 313 communicate on the shared radio frequency band in one or more beam directions determined to be available. In that regard, action 305 may include determining that one or more channel occupancy sensing criteria are met for one or more of the beam directions monitored. The criteria may include a measured signal energy threshold, a sensing period, a number of sensing occasions for each beam direction, a sensing periodicity, or any other suitable criteria. Thus, the first BS 303*a* may determine to proceed with communications in the shared frequency band in one or more of the available beam directions for which the sensing criteria were met. In other aspects, the first BS 303*a* may refrain, based on the NOL, from transmitting in any of the monitored beam directions. Further, it will be understood that, although the description of the method 300 refers to monitoring, transmitting, and backing off of a shared frequency band, the first BS 303*a* may monitor and back off of a subband of a shared frequency band.

In some aspects, the method 300 may be referred to as a beam-specific or directional DFS scheme. In a DFS scheme, a wireless node monitors for interference on a shared frequency band, and selects a different frequency band in response to detecting interference. The wireless node may maintain and update a non-occupancy list (NOL) which indicates the shared frequency bands and/or subbands that are occupied. The wireless node may avoid using occupied channels for significant amount of time, such as several seconds, or several minutes. For example, in some aspects, a wireless node using DFS may avoid using an occupied channel for at least thirty minutes after detecting interference. DFS may be used in wireless local area networks (WLANs) to detect the presence of an incumbent wireless node, which may include radar equipment. In this regard, the incumbent wireless node may have priority access to the shared frequency band. Accordingly, the wireless node (e.g., Wi-Fi router) may monitor for radar signals on a shared frequency band/subband for a period of time before commencing communications on the shared frequency band/subband. The wireless node may, upon commencing communications in the shared frequency band, continuously scan for radar signal patterns.

A DFS scheme may be periodic, and may be performed according to various parameters. For example, the DFS scheme may include a non-occupancy period, which is the time period during which the wireless node will avoid using shared frequency band after interference or an incumbent wireless signal is detected. The DFS scheme may also include a channel availability check parameter, which indicates that a channel will be monitored to determine if an incumbent wireless signal above a signal threshold is detected. Further, the DFS scheme may include a channel availability check time parameter, which is the period of time during which a channel availability check is performed. The DFS scheme may further include a channel move time, which is the period of time to cease all transmissions on the current channel upon detection of an incumbent wireless signal above a signal threshold.

Although FIG. 3 is described in the context of a first BS 303a performing beam monitoring, beam selection, and back-off in a single shared frequency band or channel, it should be understood that in other examples, the first BS 303a may utilize the method 300 in one frequency channel and may switch to another frequency channel and apply the method 300 to the other channel.

Figure 4:
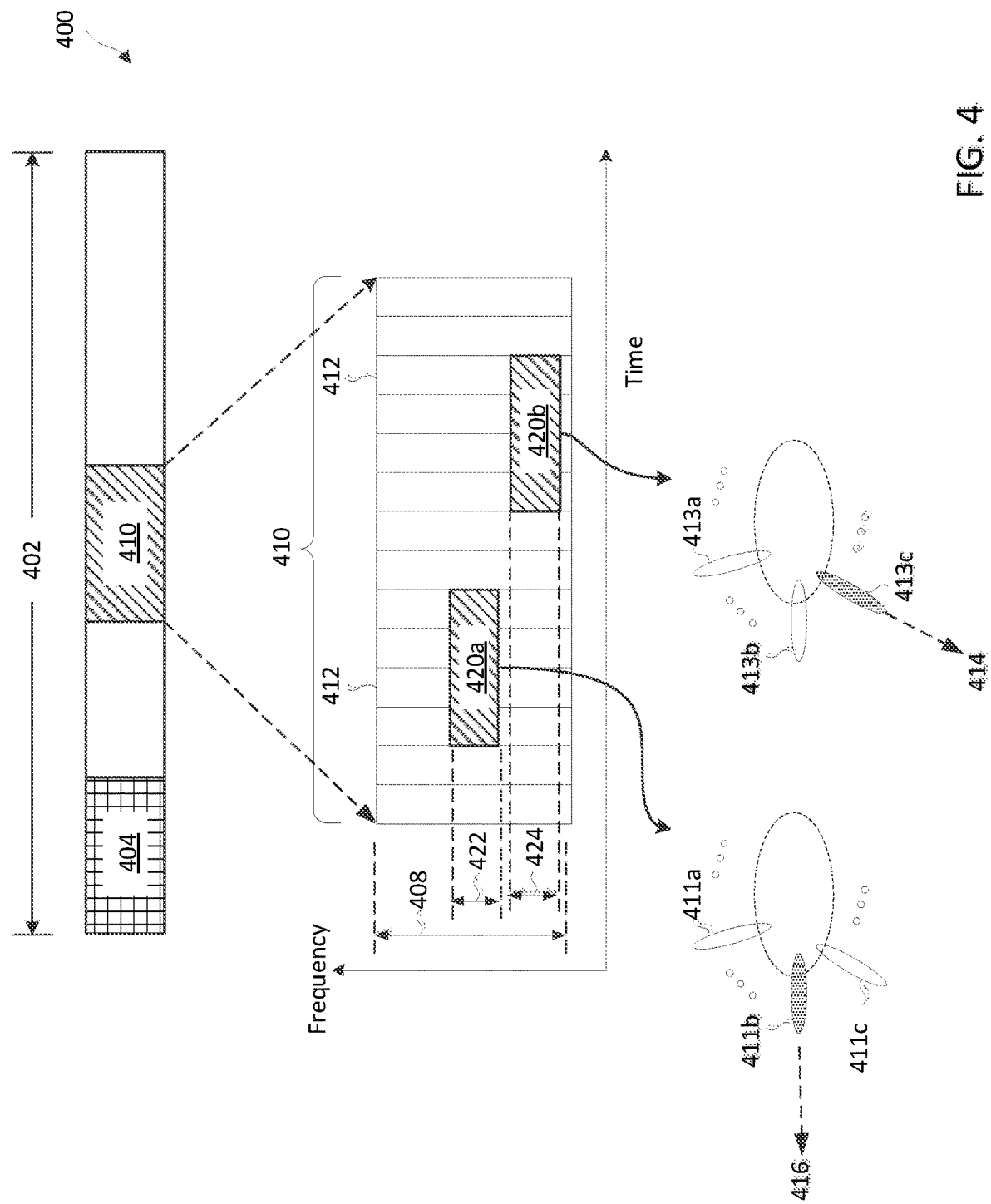
FIG. 4 is a timing diagram illustrating a channel occupancy monitoring scheme according to aspects of the present disclosure.

FIG. 4 is a timing diagram illustrating a channel occupancy monitoring scheme according to aspects of the present disclosure. The scheme 400 may be employed by BSs such as the BSs 105 and UEs such as the UEs 115 in a network such as the network 100 for communications. In particular, the BS may communicate with the UE using time-frequency resources configured as shown in the scheme 400. In FIG. 4, the x-axis represent time in some arbitrary units and the y-axis represent frequency in some arbitrary units. The scheme 400 shows communications transmitted and received by a wireless system, such as the first BS 303a. The scheme 400 is performed during a time window 402, in which a first system transmits or receives DL data in block 404, and performs channel occupancy sensing during a sensing window 410. The first system may be performing channel occupancy sensing during sensing window 410 as described above with respect to action 315 in the method 300 shown in FIG. 3.

Referring to FIG. 4, the system monitors during the sensing window 410 within the time window 402 and across a frequency band 408. The system may be associated with a first network. In some aspects, the frequency band 408 may include a shared radio frequency band, such as a mmWave shared frequency band. The frequency band 408 includes subbands 422 and 424. During the sensing window 410, the system detects a first signal 420a and a second signal 420b from a second network (e.g., transmitted by a second BS 303b in FIG. 3). In some aspects, the first network and the second network may be associated with a same priority. The first signal 420a is detected in the first subband 422 and the second signal 420b is detected in the second subband 424.

The signals 420a and 420b are transmitted across time periods 412. In some aspects, the time periods 412 may represent individual symbols, or individual slots. For example, each signal 420a, 420b may occupy a plurality of symbols within a single slot. In other aspects, each signal 420a, 420b may occupy a plurality of slots. In one aspect, each signal 420a, 420b occupies a single slot. In some aspects, the duration of the signals 420a and 420b may be associated with a time duration the first system allocates for sensing in each of a plurality of beam directions. In other aspects, the duration of each signal 420a, 420b is based on a signal configuration of the second system. The signals 420a and 420b may be associated with network traffic and communications between wireless communication devices in the second network. In some aspects, the first system may be otherwise silent during the sensing window 410, such that the first system refrains or ceases from transmitting data and/or monitoring for data.

In addition to being associated with different subbands, the signals 420a and 420b are associated with different beams 411 having different beam directions. In this regard, the first system (such as the first system 303b shown in FIG. 3) receives the signals 420 in a plurality of beams associated with different beam directions, including receive beam direction 414 and 416. The first signal 420a is received in a second beam 411b having a beam direction 416. The second signal 420b is received in a third beam 413c having a beam direction 414. The signals 420a and 420b may be transmitted according to a beam pattern determined by the second system. The beam pattern may be a beam sweeping pattern, a periodic pattern, a repetitive pattern, an asymmetrical pattern, or any other suitable beam pattern as will be discussed more fully below. In this regard, a repetitive pattern may refer to a pattern having multiple successive signals transmitted or received in a same beam direction. For example, a BS may apply a repetitive beam pattern by using beamforming to receive two, three, or more successive signals in a first beam direction, and then receive two, three, or more successive signals in a different second beam direction, and so on. The repetitive beam pattern may include transmitting or receiving multiple times in each beam direction while cycling through the beam directions. An asymmetrical beam pattern may include transmitting or receiving signals a different number of times in different beam directions. For example, an asymmetrical beam pattern may include a periodic pattern in which the BS transmits or receives two times in a first beam direction, but only one time in a second and third beam direction. A beam sweeping pattern may include transmitting or receiving in each beam direction a single time, and repeating the pattern in a periodic fashion. The beam pattern may be associated with the network traffic and location of wireless communication devices within the second network.

Figure 5A:
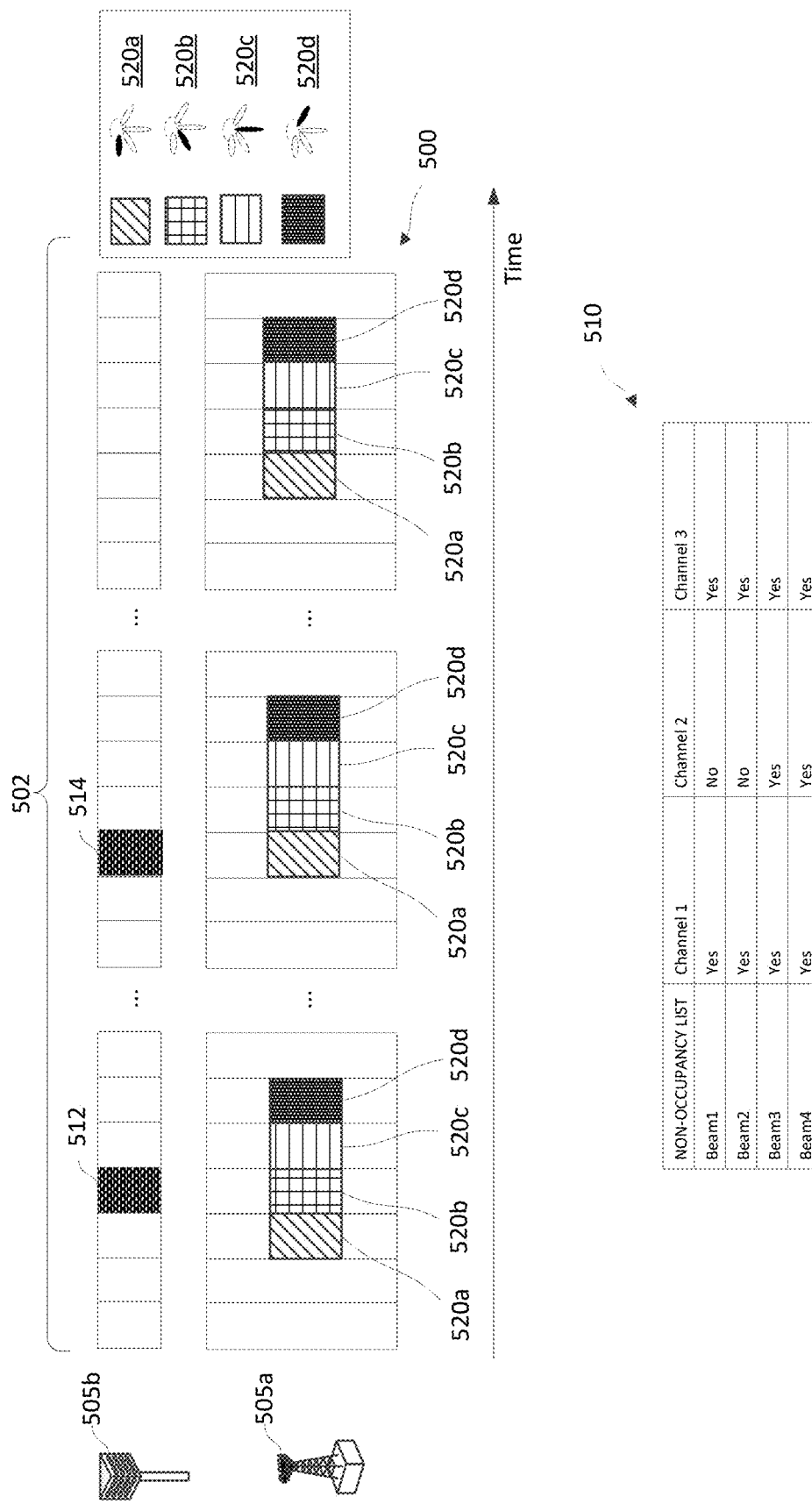
FIG. 5A illustrates a channel occupancy monitoring and response scheme according to aspects of the present disclosure.
Figure 5B:
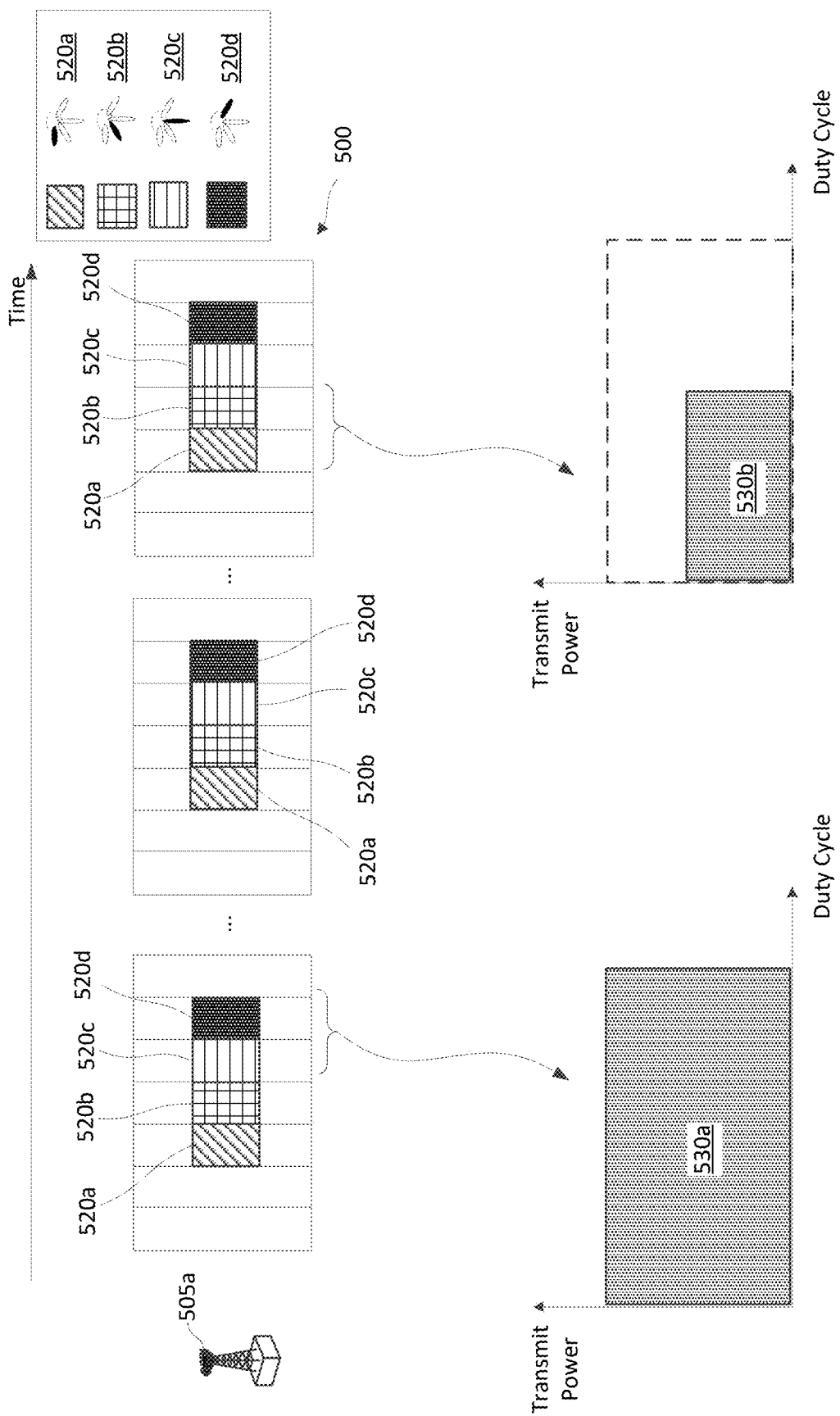
FIG. 5B illustrates a channel occupancy monitoring and response scheme according to aspects of the present disclosure.

FIGS. 5A and 5B illustrate a channel occupancy monitoring and response scheme 500 according to aspects of the present disclosure. The scheme 500 is performed by a wireless system including a first BS 505a, and a second system including a second BS 505b. The first BS 505a is associated with a first network and the second BS 505b is associated with a second network. The first and second network are associated with a same, or equal, priority. The second BS 505b and the first BS 505a may be operating, or attempting to operate, in a shared radio frequency band, such as a mmWave band. The scheme 500 is performed during a sensing window 502. The x-axis represents time in some arbitrary units. The sensing window 502 may refer to a set of time and/or frequency resources configured for channel occupancy monitoring. In the scheme 500, the first BS 505a updates and maintains a non-occupancy list (NOL) based on the signals 512, 514 detected by the first BS 505a. The NOL 510 may be used by the first BS 505a to determine which channels and beam directions to use, and which channels the first BS 505a should back off, or from which the first BS 505a should reduce communications (e.g., reduce transmit power and/or duty cycle.).

Referring to FIG. 5A, the second BS 505b transmits signals 512 and 514 during the sensing window 502. The signals 512, 514 may span a time period, which may be one or more symbols, or one or more slots. The signals 512, 514 may occupy an entirety of the shared radio frequency band on which the first BS 505a is monitoring, or may occupy only a portion or one or more subbands of the shared radio frequency band which the first BS 505a is monitoring. The signals 512, 514 may be transmitted by the second BS 505b according to a beam pattern determined based on network traffic for the second network. The signals 512, 514 may be referred to as signal instances or bursts. The first BS 505a monitors for signals by sweeping through a plurality of receive beam directions 520. In this regard, FIG. 5A shows the first BS 505a sweeping through the plurality of receive beam directions 520 in a sequential, periodic pattern. However, it will be understood that the first BS 505a may perform channel occupancy sensing using other receive beam patterns than what is shown in FIG. 5A. The channel occupancy monitoring may comprise sweeping through beam directions in a sequential, contiguous manner, or in a non-contiguous or distributed manner. In some aspects, the first BS 505a may monitor in each beam direction 520 for a single, uninterrupted time period. In other aspects, the first BS 505a may monitor in each beam direction 520 for a plurality of non-contiguous time periods. The first BS 505a may monitor according to one or more channel occupancy criteria, such as a minimum channel sensing time for each beam direction 520 and/or a signal energy threshold.

The first BS 505a detects the signal 512 in a second receive beam direction 520b and detects the signal 514 in a first receive beam direction 520a, as shown in the legend. In the scheme 500, the first BS 505a may compare the received energy from the received signal to a threshold.

The NOL 510 includes a beam-and channel-specific list or table indicating the beam directions and channels (e.g., frequency bands, subbands) in which wireless signals, such as the signal 512, 514, have been detected by the first BS 505a. In this regard, the NOL 510 indicates that signals 512, 514 were detected in a first beam direction 520a (Beam1) and a second beam direction 520b (Beam2) in a second channel, which may correspond to a second frequency subband. The first BS 505a may update the NOL on a rolling basis, such that the NOL is refreshed after a period of time (e.g. several seconds, several minutes, etc.). In some aspects, individual entries of the NOL are refreshed after a period of time, or the entire NOL may be refreshed after a period of time. In the illustrated aspect, the NOL 510 indicates a binary yes/no for each channel and each beam direction. In other aspects, the NOL 510 may indicate a signal energy or signal intensity associated with each channel and beam direction. The NOL may be stored by the first network, such as on a memory of the first BS 505a. For example, the NOL 510 may be stored in the memory 1004 of the BS 1000.

In FIG. 5B, the first BS 505a determines, based on the NOL 510, a communication scheme for the shared frequency band, including which beam directions can be used with a maximum transmit power and/or a maximum duty cycle (e.g., based on regulations and/or the first BS 505a's capabilities), which beam directions can be used with reduced transmit power and/or duty cycle, and/or which beam directions will be blocked off. In some aspects, the first BS 505a determines, based on the NOL 510, whether and how to reduce communications on a frequency subband for one or more beam directions. In the example shown in FIG. 5B, the first BS 505a is configured to communicate in the shared frequency band using a first transmit power and a first duty cycle combination 530a for the third and fourth beam directions 520c, 520d, and to communicate using a reduced second transmit power and second duty cycle combination 530b for the first and second beam directions 520a, 520b, for example, based on detecting channel occupancy signals from the second network in the first and second beam directions 520a, 520b. In some aspects, the first transmit power and first duty cycle of the first combination 530a may be a maximum transmit power and a maximum duty cycle. In other aspects, the first transmit power and first duty cycle of the combination 530a may not be a maximum transmit power and maximum duty cycle, but may be greater than the reduced second transmit power and second duty cycle combination 530b used for the first and second beam directions 520a, 520b. By reducing the transmit power and duty cycle for the occupied first and second beam directions 520a, 520b, the first BS 505a can continue to use the shared frequency band for all beam directions while still reducing the risk of collisions for devices in the second network.

In other words, the first BS 505a (and/or the first network associated with the first BS 505a) can communicate in the shared frequency band in only those beam directions for which no signals exceeding a threshold were detected, or may communicate in all of the beam directions, including the first and second beam directions 520a, 520b, which are associated with detected signals from another network. The first BS 505a may communicate in the available beam directions using a first transmit power and duty cycle combination 530a, which may correspond to a maximum transmit power and a maximum duty cycle. The first BS 505a may also communicate in the shared frequency band in the occupied beam directions 520a, 520b using a reduced transmit power and duty cycle combination 530b. In some aspects, the first BS 505a may determine an amount of transmit power to back-off (e.g., a reduction of X decibel-milliwatt (dBm) or a percentage of transmit power) and/or an amount of duty cycle reduction (e.g., reduce an active transmission by a percentage of a total time) based on signal measurements obtained in the occupied beam directions. In some aspects, the first BS 505a may reduce the transmit power in the occupied beam direction, but not the duty cycle (e.g., based on a traffic pattern). In some aspects, the first BS 505a may reduce the duty cycle, but not the transmit power (e.g., based on a reliability constraint). In some aspects, the first BS 505a may tradeoff transmit power and duty cycle.

In some aspects, the first BS 505a may refrain from communicating on an entire bandwidth of the shared frequency band. In other aspects the first BS 505a may refrain from communicating on only the portion of the frequency band in which the signal 512 is detected. In some aspects, the first BS 505a may refrain from communicating in the beam directions in which the signals 512, 514 are detected. In some aspects, the first BS 505a may reduce transmit power and/or duty cycle for all beam directions if signals are detected in one or more beam directions.

Figure 6:
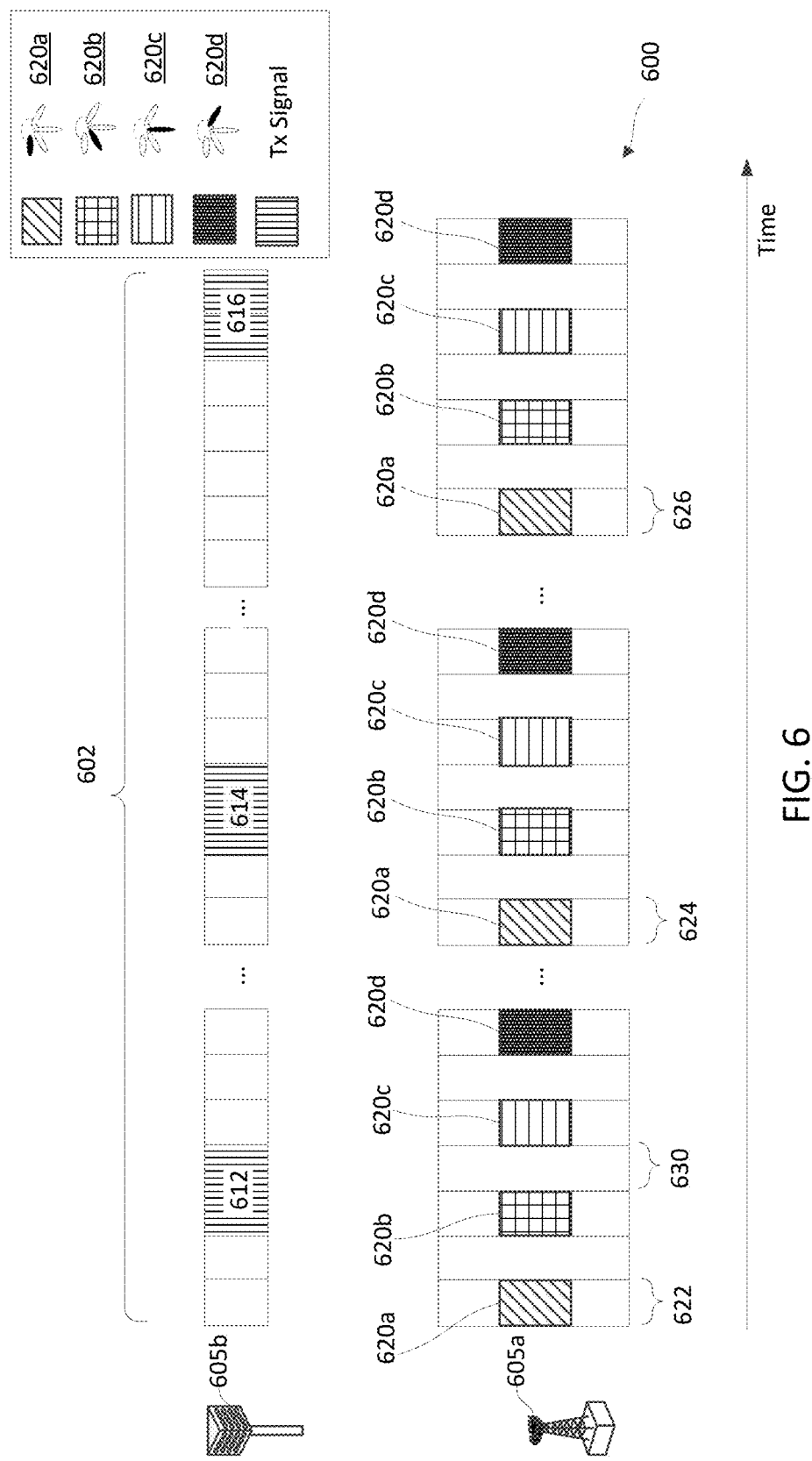
FIG. 6 illustrates a channel occupancy monitoring scheme according to aspects of the present disclosure.

FIG. 6 illustrates a channel occupancy monitoring response scheme 600 according to aspects of the present disclosure. The scheme 600 may be similar to the scheme 500 shown in FIGS. 5A and 5B. However, in the scheme 600 of FIG. 6, the first BS 605a uses a non-contiguous or distributed channel sensing procedure instead of the contiguous channel sensing procedure shown in FIGS. 5A and 5B. The scheme 600 is performed by a wireless network (NW #1) including a first BS 605a, and a second wireless network (NW #2) including a second BS 605b. The first BS 605a is associated with a first network and the second BS 605b is associated with a second network. The first and second network are associated with a same, or equal, priority. The second BS 605b and the first BS 605a may be operating, or attempting to operate, in a shared radio frequency band, such as a mmWave band. The scheme 600 is performed during a sensing window 602. The x-axis represents time in some arbitrary units. The sensing window 602 may refer to a set of time and/or frequency resources allocated for channel occupancy monitoring. The second BS 605b and the first BS 605a may be configured to perform the channel occupancy scheme 600 according to a directional DFS scheme. In the scheme 600, the first BS 605a updates and maintains a non-occupancy list (NOL) based on the signals 612, 614, 616 detected by the first BS 605a. The NOL may be used by the first BS 605a to determine which channels and beam directions to use, and which channels the first BS 605a should back off, or from which the first BS 605a should reduce communications (e.g., reduce transmit power and/or duty cycle.).

The second BS 605b transmits signals 612, 614, 616 during the sensing window 602. Each of the signals 612, 614, 616 may span a time period, which may be one or more symbols, or one or more slots. The signals 612, 614, 616 may occupy an entirety of the shared radio frequency band on which the first BS 605a is monitoring, or may occupy only a portion or one or more subbands of the shared radio frequency band which the first BS 605a is monitoring. The signals 612, 614, 616 may be transmitted by the second BS 605b according to a beam pattern determined based on network traffic for the second network. FIG. 6 shows the first BS 605a sweeping through the plurality of receive beam directions 620 in a sequential, non-contiguous pattern in which the sensing in each beam direction 620 is separated by a time period, such as one or more slots or symbols 630. In some aspects, the sensing periods for each beam direction 620 may be described as interrupted or distributed. The first BS 605a may monitor according to one or more channel occupancy sensing criteria, such as a minimum channel sensing time for each beam direction 620 and/or a signal energy threshold.

In the scheme 600, the channel occupancy sensing criteria may specify that the first BS 605a monitors in each beam direction 620 for an aggregate period including a plurality of non-contiguous sensing periods for each beam direction 620. For example, the channel occupancy sensing criteria may specify that the first BS 605a monitor in the first beam direction 620a for three non-contiguous time periods 622, 624, 626, which may be referred to as sensing occasions. The sum of the time periods 622, 624, 626 may correspond to a minimum beam direction sensing period that is applied for all beam directions 620. In some aspects, the same minimum sensing period and/or number of sensing occasions may be used for each beam direction 620. In other aspects, different minimum sensing periods and/or numbers of sensing occasions may be used for each beam direction 620. In some aspects, the channel occupancy sensing criteria may also specify a threshold signal energy, and or a threshold detection period used by the first BS 605a to determine whether a channel is occupied for a given beam direction 620. In other aspects, the first BS 605a is configured to determine that the shared frequency band, or a subband of the shared frequency band, is occupied for a given beam direction 620 if any signals exceeding the signal threshold are detected in the beam directions 620.

In this regard, the first signal or first instance of the signal 612 is detected in the second beam direction 620b of a first receive sequence. The second signal 614 is detected in the second beam direction 620b of a second receive sequence. The third signal 616 is detected in the fourth beam direction 620d in a third receive sequence. Accordingly, the signals 612, 614, 616 are detected by the first BS 605a in a total of two beams. Upon detecting signals in two of the four beam directions, the first BS 605a may back off from the channel, or reduce communications in the channel.

In the scheme 600, the first BS 605a may be configured to make a determination for backing off of communications in all of the beam directions 620 by comparing the number of occupied beams to a threshold. The first BS 605a may be configured to apply any suitable threshold, including one beam, two beams, four beams, five beams, ten beams, or any other suitable number, both greater or smaller. In other words, the first BS 605a may be configured to back off of a shared frequency in response to detecting channel occupancy (e.g., the signal 612) in K or more beam directions of the plurality of beams directions 620, where K is an integer.

Figure 7A:
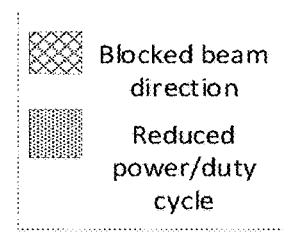
FIG. 7A illustrates a channel occupancy monitoring response scheme according to aspects of the present disclosure.
Figure 7A:
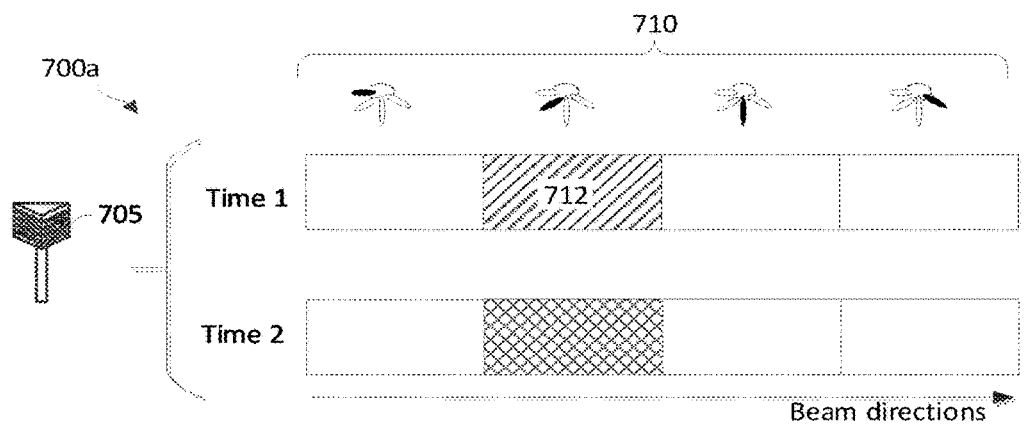
Figure 7B:
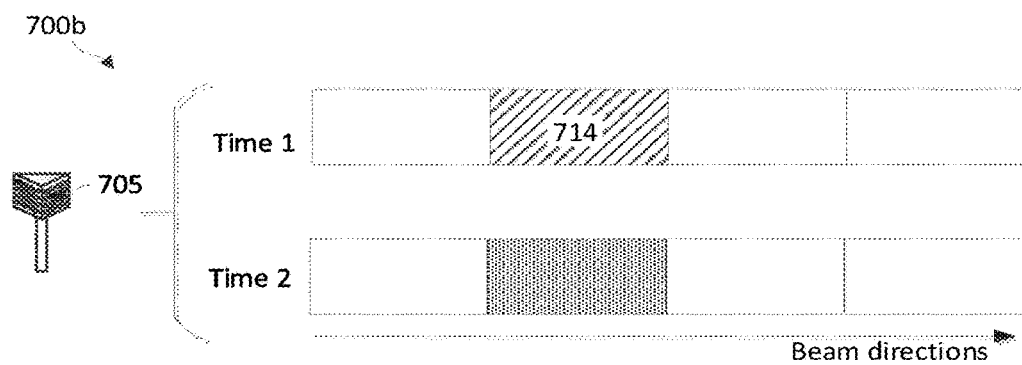
FIG. 7B illustrates a channel occupancy monitoring response scheme according to aspects of the present disclosure.
Figure 7C:
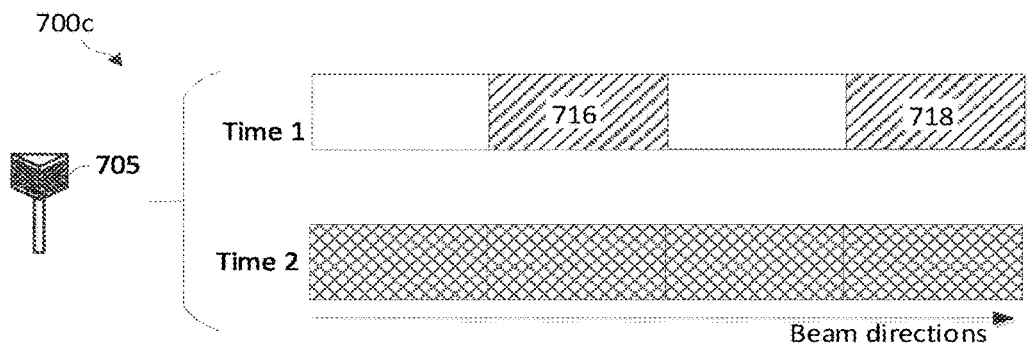
FIG. 7C illustrates a channel occupancy monitoring response scheme according to aspects of the present disclosure.

FIGS. 7A-7C illustrate channel occupancy monitoring response schemes 700 according to various aspects of the present disclosure. The schemes 700 are performed by a BS 705 associated with a first network (e.g., NW #1). The BS 705 may be any of the BSs 105 of the network 100. The schemes 700 show the BS 705 sensing or detecting, in a shared frequency band, a signal from a wireless node associated with a different network (NW #2) at Time 1. At Time 2, the schemes 700 show the BS 705 determining a communication scheme for the shared frequency band at Time 2. In particular, the BS 705 determines, based on the detecting at Time 1, the beam directions and/or transmitting parameters to use for communications in the shared frequency band based on the detecting. The BS 705 is configured to monitor in each of a plurality of beam directions 710, where each box within a row (along the x-axis) represents a different beam direction.

In the scheme 700a shown in FIG. 7A, the BS 705 is configured to monitor, at a first time (Time 1) for a signal in the shared radio frequency band. The shared radio frequency band comprises a bandwidth and extends across multiple subbands. In some aspects, the bandwidth of the shared radio frequency band may correspond to a system bandwidth, and the subbands may correspond to bandwidth-parts. The BS 705 detects a signal 712 (shown by the diagonal-stripe-patterned box representing a signal burst) in a second beam direction (from left to right) of a plurality of beam directions. The signal 712 is associated with a second network different from the first network of the BS 705. The BS 705 may monitor for the signals according to a beam-sweeping pattern, which may be periodic or aperiodic, and/or contiguous or non-contiguous.

In response to detecting the signal 712 in the second beam direction, the BS 705 updates a non-occupancy list (NOL) to indicate that the shared frequency band, or a subband of the shared frequency band, is occupied in the second beam direction. In some aspects, the occupied frequency band or subband may be referred to as an occupied channel. The NOL may include a matrix or table indicating channel occupancy on a per-beam and per-channel basis. The BS 705 may determine whether a frequency band or subband is occupied in a given beam direction by comparing a measured signal energy to a signal energy threshold. In the embodiment of FIG. 7A, if the BS 705 determines that the signal energy measurement in the shared radio frequency band exceeds or satisfies the threshold, the BS 705 refrains from communicating in the second beam direction on the frequency band for a predetermined amount of time (shown by the criss-cross-patterned box). In the scheme 700*a*, the BS 705 refrains from transmitting in the shared frequency band in each beam direction for which a signal exceeding the signal energy threshold was detected.

In the scheme 700*b* shown in FIG. 7B, the BS 705 is configured to reduce signal transmission parameters, such as transmit power and/or duty cycle, in response to detecting a signal 714. In this regard, the signal 714 is transmitted and detected in the second beam direction. The BS 705 is configured to update the NOL to indicate that the shared frequency band, or a subband of the shared frequency band, is occupied in the second beam direction. Based on the NOL, the BS 705 determines to reduce transmit power and/or duty cycle from a first value to a reduced second value for communications in the second beam direction and in the shared frequency band. Thus, the BS 705 many continue to communicate in the occupied beam direction(s) of the occupied frequency band, albeit with reduced transmission parameters. The transmit power may be reduced to any suitable amount of power, including 10%, 25%, 50%, 75%, or any other suitable value. Further, the duty cycle may be reduced to any suitable percentage of active transmission time, including 10%, 25%, 50%, 75%, or any other suitable percentage of total time. In some aspects, the reduction in transmit power and/or duty cycle is fixed based on detecting a signal in a given beam direction. Thus, the BS 705 may apply a binary decision framework for determining whether to use a fixed reduced transmit power/duty cycle, or a fixed normal transmit power/duty cycle. In other aspects, the reduction in transmit power and/or duty cycle is variable. For example, the transmit power and/or duty cycle applied by the BS 705 for communications in the occupied beam direction may be based on a measured signal energy and/or measured duration of the signal from the second network. For example, for larger measured signal energies, the BS 705 may reduce the transmit power of communications in the occupied beam direction to a smaller value.

In the scheme 700*c* shown in FIG. 7C, the BS 705 determines whether to transmit in all of the beam directions 710 or none of the beam directions 710 based on a number of available or non-occupied beam directions in which a signal is not detected. In this regard, the BS 705 detects a first signal 716 in a first beam direction and a second signal 718 in a fourth beam direction. In the illustrated example, the BS 705 may apply a threshold value (K) of two non-occupied beam directions to determine whether to transmit in all of the beam directions or none of the beam directions. For example, the threshold value K is 3 in the illustrated scenario. In this instance, the BS 705 determines that there are not three or more non-occupied beam directions of the plurality of beam directions 710. Accordingly, the BS 705 determines that none of the beam directions 710 can be used at Time 2 (as illustrated by the criss-cross pattern). If, by contrast, the BS 705 determines that there are three or more non-occupied beam directions, the BS 705 determines that all of the beam directions 710 can be used. It will be understood that the threshold K may be any suitable value, including 1, 2, 3, 4, 5, 8, 10, or any other suitable value, both greater or smaller.

In some aspects, the BS 705 may determine the beam directions for monitoring based on data traffic scheduled for transmission and/or reception by the BS 705. In this regard, if the BS 705 intends to transmit and/or receive signals to/from one or more UEs within its network, the BS 705 may select and monitor those beam directions which may be used for data communications. In some aspects, limiting or tailoring the monitored beam directions to only those beam directions which may be used subsequently, the BS 705 may use network resources more efficiently to monitor for channel occupancy in the plurality of beam directions.

In some aspects, depending on the geographical locations of the wireless devices of different networks, a first network BS (e.g., a BS 303*a*, 605*a*) may be further away from a second network BS (e.g., BS 303*b*, 605*b*) than a second network UE. In this scenario, the first network BS may not be able to detect a signal transmitted by the second network BS. Accordingly, the present disclosure describes mechanisms for UE-assisted channel occupancy monitoring in which one or more UEs in a first network are configured to monitor for signals from a different second network to increase the chances that the first network detects channel occupancy for one or more beam directions during a sensing window.

Figure 8:
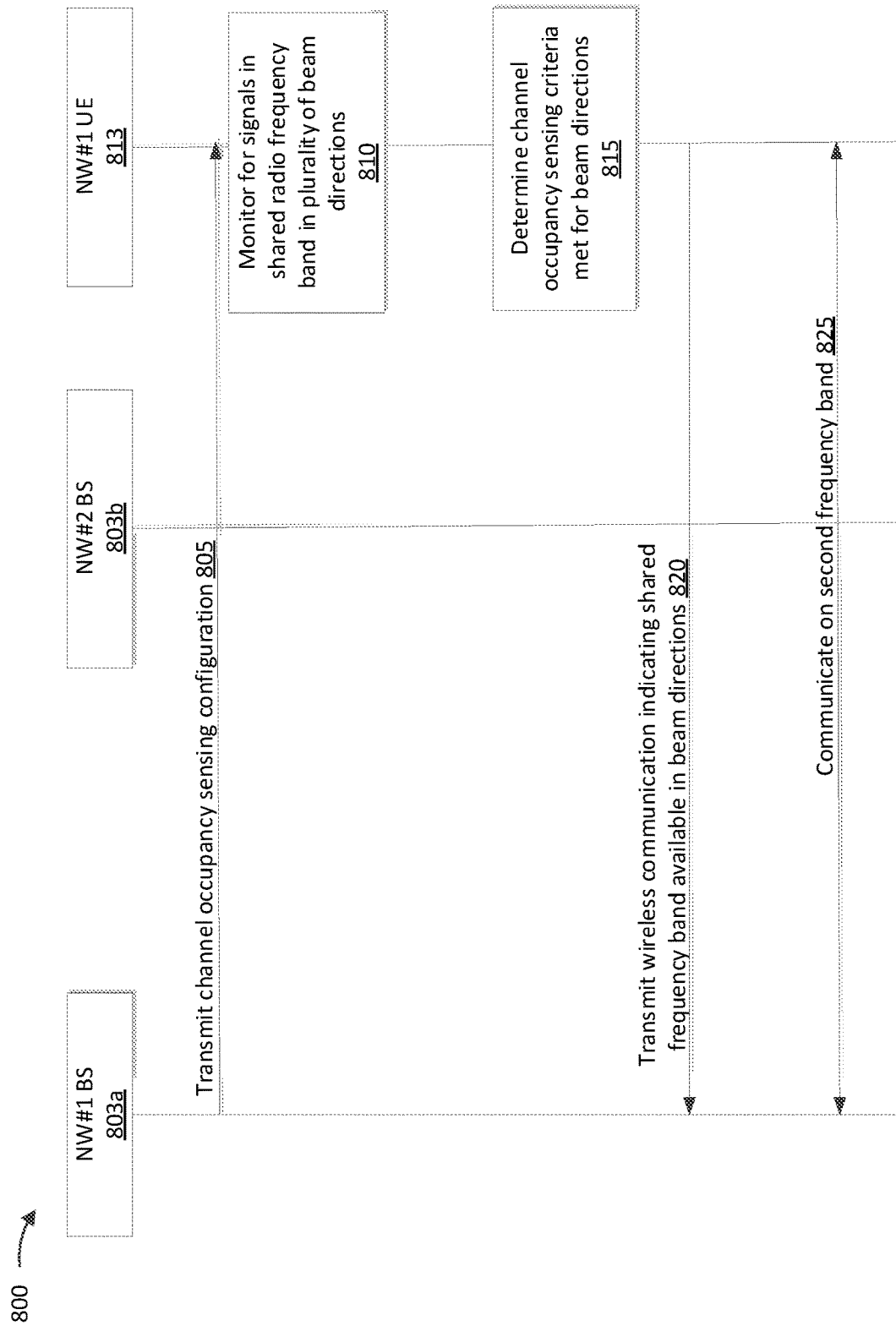
FIG. 8 is a signaling diagram of a UE-assisted channel occupancy monitoring scheme according to aspects of the present disclosure.

FIG. 8 is a signaling diagram of a UE-assisted channel occupancy monitoring scheme 800. The scheme 800 is performed by a first BS 803*a*, a second BS 803*b*, and UEs 813 sharing a shared frequency band (e.g., a mmWave band) for communications. The first BS 803*a* is associated with a first network, and the second BS 803*b* is associated with a different second network. The first and second networks may be associated with a same or equal priority. The second BS 803*b* and the first BS 803*a* may be BSs 105 in the network 100. The UEs 813 may be the UEs 115 of the network 100. The UEs 813 are associated with the first network of the first BS 803*a*. In some aspects, the first BS 803*a* and/or the second BS 803*b* may utilize one or more components of the BS 1000, such as the processor 1002, the memory 1004, the Channel occupancy module 1008, the transceiver 1010, the modem 1012, and the one or more antennas 1016, to execute the steps of the method 800. The UEs 813 may include any of the UEs 115 shown in FIG. 1. The UEs 813 may utilize one or more components of the UE 900, such as the processor 902, the memory 904, the Channel occupancy module 908, the transceiver 910, the modem 912, and the one or more antennas 916, to execute the steps of the method 800.

In action 805, the first BS 803*a* transmits a channel occupancy sensing configuration to the UE 813. The sensing configuration may indicate a plurality of parameters of the channel occupancy sensing, such as a channel occupancy sensing period, a signal threshold, a beam pattern, or any other suitable channel occupancy sensing parameter described herein. For example, the sensing configuration may indicate a minimum sensing period for each beam direction of the plurality of beam directions and/or a number of sensing occasions for each beam direction. The sensing configuration may be transmitted in an RRC message, in a system information block (SIB), or any other suitable mechanism.

In action 810 the UE 813 monitors for signals in the shared frequency band during a sensing window. Monitoring for the signal may include silencing or ceasing other communications on the frequency band during the sensing window. Further, monitoring for the signals may include performing signal measurements during the sensing window, comparing the measured energy to a threshold, and/or performing signal detection. Signal detection may include computing a cross-correlation between a signal received from the channel and a known channel occupancy waveform or sequence and comparing the cross-correlation to a threshold. A channel occupancy signal is detected when the cross-correlation exceeds the threshold. The UE 813 may be configured to monitor for the signal across an entire bandwidth of the frequency band, or may be configured to monitor for the signal in each of a plurality of subbands of the frequency band. Further, the UE 813 may be configured to use beamforming to sweep or scan through a plurality of received beams to focus the received energy in specific beam directions as described above with respect to FIGS. 5A, 5B, and 6. The beam pattern may be contiguous or non-contiguous.

In action 815, the UE 813 determines that the channel occupancy sensing criteria has been met for one or more beam directions of the plurality of beam directions monitored. In some aspects, the UE 813 may also determine in action 815 that the channel occupancy sensing criteria have not been met for one or more beam directions of the plurality of beam directions monitored. As explained above, the UE 813 may determine that the sensing criteria is met if the measured signal energy for a given sensing period falls below a threshold indicated by the channel occupancy sensing configuration. The sensing period may include a single, contiguous time period for each beam, or may be the sum or aggregate of a plurality of distributed, non-contiguous time periods. The UE 813 may determine whether the channel occupancy sensing criteria are met for each of the plurality of beam directions.

In action 820, the UE 813 transmits, to the first BS 803a a wireless communication indicating that the shared frequency band (on one or more subbands of the frequency band) is available in one or more of the monitored beam directions. Further, action 820 may include indicating, to the first BS 803a, that the sensing criteria were not met for one or more beam directions. In this regard, action 820 may include transmitting a table or list similar to the NOL 510 described with respect to FIG. 5A.

In action 825, the first BS 803a communicates with the UE 813 on the shared frequency band according to the channel sensing information shared by the UE 813 in action 820. In some aspects, action 825 may include refraining from communicating in the shared frequency band in at least one of the beam directions for which the channel occupancy sensing criteria was not met. In other aspects, action 825 includes transmitting in the occupied beam directions in the shared frequency band using a reduced transmit power and/or a reduced duty cycle. In other aspects, action 825 may include communicating in all beam directions if the number of occupied beam directions falls below a certain threshold (e.g., 3 beam directions). In other aspects, action 825 includes communicating in none of the beam directions of the number of occupied beam directions meets or exceeds the threshold. The UE may be configured to periodically refresh a channel occupancy status to reflect a channel clear status. For example, the UE may be configured to refresh a DFS status to reflect a DFS clear status.

The parameters of the channel occupancy monitoring may be performed according to dynamic frequency selection (DFS) configurations and parameters. Accordingly, the channel occupancy monitoring may be referred to as directional DFS monitoring. The individual parameters of the channel occupancy configurations may be indicated as DFS parameters, including a silencing interval configuration, minimum channel sensing time, DFS periodicity, DFS offset, and/or any other suitable DFS parameter.

Figure 9:
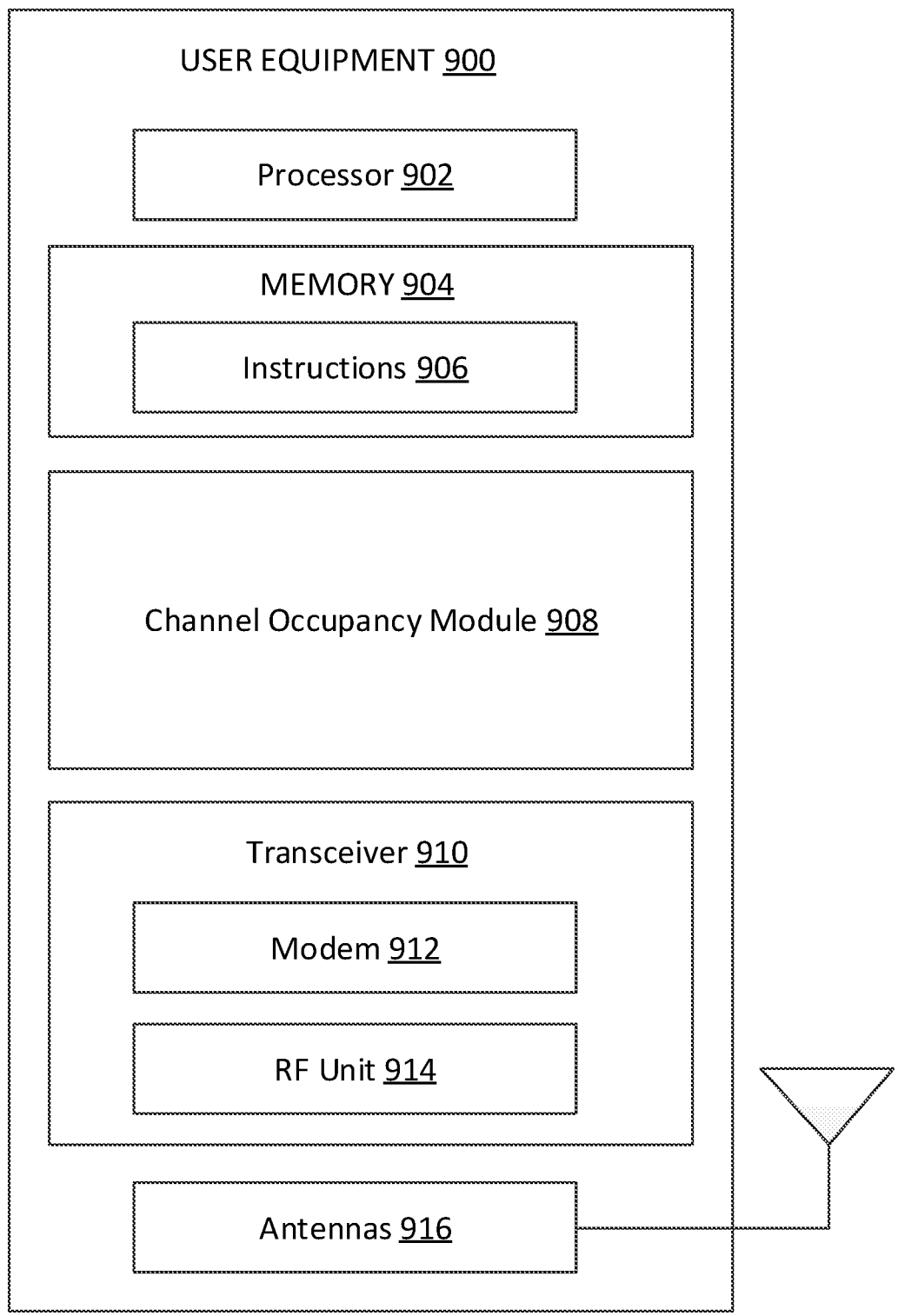
FIG. 9 illustrates a block diagram of a base station (BS) according to some aspects of the present disclosure.

FIG. 9 is a block diagram of an exemplary UE 900 according to some aspects of the present disclosure. The UE 900 may be a UE 115 as discussed above in FIGS. 1 and 15. As shown, the UE 900 may include a processor 902, a memory 904, a channel occupancy module 908, a transceiver 910 including a modem subsystem 912 and a radio frequency (RF) unit 914, and one or more antennas 916. These elements may be in direct or indirect communication with each other, for example via one or more buses.

The processor 902 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 904 includes a non-transitory computer-readable medium. The memory 904 may store, or have recorded thereon, instructions 906. The instructions 906 may include instructions that, when executed by the processor 902, cause the processor 902 to perform the operations described herein with reference to the UE 115 in connection with aspects of the present disclosure, for example, aspects of FIGS. 5-10. Instructions 906 may also be referred to as code, which may be interpreted broadly to include any type of computer-readable statement(s) as discussed above.

The channel occupancy module 908 may be implemented via hardware, software, or combinations thereof. For example, the channel occupancy module 908 may be implemented as a processor, circuit, and/or instructions 906 stored in the memory 904 and executed by the processor 902. In some instances, the channel occupancy module 908 can be integrated within the modem subsystem 912. For example, the channel occupancy module 908 can be implemented by a combination of software components (e.g., executed by a DSP or a general processor) and hardware components (e.g., logic gates and circuitry) within the modem subsystem 912.

The channel occupancy module 908 may communicate with one or more components of UE 900 to implement various aspects of the present disclosure, for example, aspects of FIG. 8. For instance, the channel occupancy module 908 may be configured to cooperate with the transceiver 910 to receive, from a base station (BS) associated with a first wireless network, a channel occupancy sensing configuration. The channel occupancy module 908 may be further configured to monitor, in a shared frequency band in a plurality of beam directions, for signals associated with one or more second wireless networks different from the first wireless network, wherein the monitoring is based on the channel occupancy sensing configuration. The channel occupancy module 908 may be further configured to cause the transceiver 910 to transmit, to the BS, a first wireless communication indicating that the shared frequency band is available for communications in the first wireless network in one or more beam directions of the plurality of beam directions.

In some aspects, the channel occupancy module 908 may be configured to cooperate with the transceiver 910 to receive a system information block (SIB) message comprising the channel occupancy sensing configuration. In some aspects, the UE monitoring for the signals associated with the one or more wireless networks includes the UE monitoring for the signals associated with the one or more wireless networks during an initial access procedure. In some aspects, the channel occupancy module 908 may be configured to cooperate with the transceiver 910 to receive a radio resource control (RRC) configuration comprising the channel occupancy sensing configuration. In some aspects, the channel occupancy module 908 is configured to monitor, before receiving the RRC configuration, for the signals associated with the second wireless network in each beam direction of the plurality of beam directions based on a preconfigured channel sensing configuration. In some aspects, the channel occupancy module 908 is configured to initiate, in response to receiving the RRC configuration, the monitoring for the signals associated with the second wireless network. In some aspects, the channel occupancy module 908 is configured to cause the transceiver 910 to transmit, in a first beam direction of the one or more beam directions, a physical random access channel (PRACH) signal based on the first beam direction being available for communications. In some aspects, the channel occupancy module 908 is configured to transmit a report indicating that a first beam direction of the one or more beam directions is available for communication. In some aspects, the channel occupancy module 908 is configured to cause the transceiver 910 to transmit a physical uplink control channel (PUCCH) signal or a physical uplink share channel (PUSCH) signal indicating that the one or more beam directions are available for communication.

As shown, the transceiver 910 may include the modem subsystem 912 and the RF unit 914. The transceiver 910 can be configured to communicate bi-directionally with other devices, such as the BSs 105, 205, 303, 505, 605, 705, 803, and 1000. The modem subsystem 912 may be configured to modulate and/or encode the data from the memory 904 and/or the channel occupancy module 908 according to a modulation and coding scheme (MCS), e.g., a low-density parity check (LDPC) coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., HARQ ACK/NACK) from the modem subsystem 912 (on outbound transmissions) or of transmissions originating from another source such as a UE 115 or a BS 105. The RF unit 914 may be further configured to perform analog beamforming in conjunction with the digital beamforming. Although shown as integrated together in transceiver 910, the modem subsystem 912 and the RF unit 914 may be separate devices that are coupled together at the UE 115 to enable the UE 115 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may further receive data messages transmitted from other devices. The antennas 916 may provide the received data messages for processing and/or demodulation at the transceiver 910. The transceiver 910 may provide the demodulated and decoded data (e.g., RRC configurations and SPS configurations, activations, reactivations, and releases, PDSCH data, DCI) to the channel occupancy module 908 for processing. The antennas 916 may include multiple antennas of similar or different designs in order to sustain multiple transmission links.

In an example, the transceiver 910 is configured to communicate with one or more components of the UE 900 to receive a channel occupancy sensing configuration, receive signals during a channel sensing period or monitoring period, and/or transmit signals to a BS indicating that a channel (e.g., frequency band or subband) is occupied in one or more beam directions.

In an aspect, the UE 900 can include multiple transceivers 910 implementing different RATs (e.g., NR and LTE). In an aspect, the UE 900 can include a single transceiver 910 implementing multiple RATs (e.g., NR and LTE). In an aspect, the transceiver 910 can include various components, where different combinations of components can implement different RATs.

Figure 10:
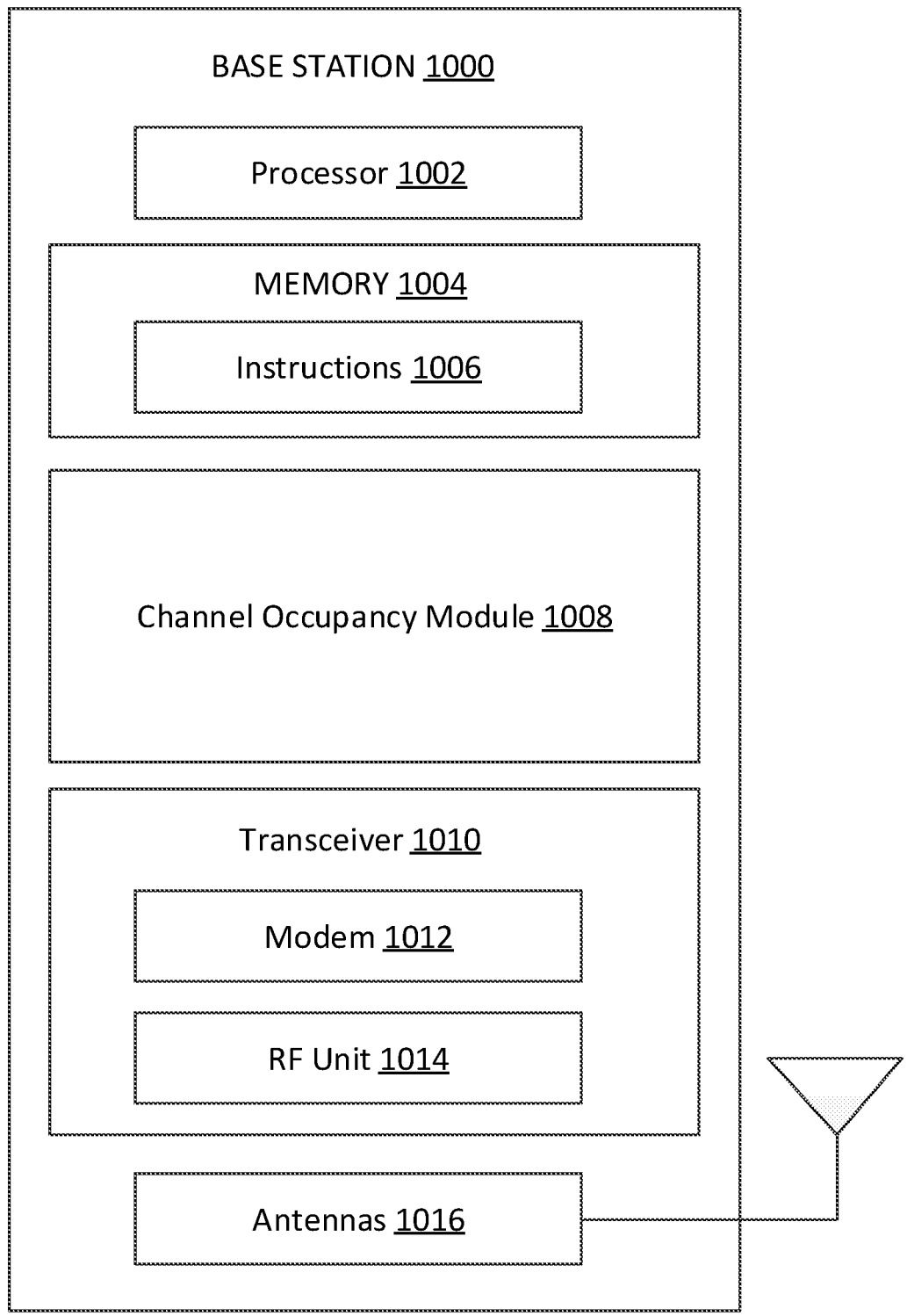
FIG. 10 illustrates a block diagram of a user equipment (UE) according to some aspects of the present disclosure.

FIG. 10 is a block diagram of an exemplary BS 1000 according to some aspects of the present disclosure. The BS 1000 may be a BS 105 as discussed in FIG. 1. A shown, the BS 1000 may include a processor 1002, a memory 1004, a channel occupancy module 1008, a transceiver 1010 including a modem subsystem 1012 and a RF unit 1014, and one or more antennas 1016. These elements may be in direct or indirect communication with each other, for example via one or more buses.

The processor 1002 may have various features as a specific-type processor. For example, these may include a CPU, a DSP, an ASIC, a controller, a FPGA device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1004 may include a non-transitory computer-readable medium. The memory 1004 may store instructions 1006. The instructions 1006 may include instructions that, when executed by the processor 1002, cause the processor 1002 to perform operations described herein, for example, aspects of FIGS. 2-6, 9, and 11. Instructions 1006 may also be referred to as program code. The program code may be for causing a wireless communication device to perform these operations, for example by causing one or more processors (such as processor 1002) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The channel occupancy module 1008 may be implemented via hardware, software, or combinations thereof. For example, the channel occupancy module 1008 may be implemented as a processor, circuit, and/or instructions 1006 stored in the memory 1004 and executed by the processor 1002. In some examples, the channel occupancy module 1008 can be integrated within the modem subsystem 1012. For example, the channel occupancy module 1008 can be implemented by a combination of software components (e.g., executed by a DSP or a general processor) and hardware components (e.g., logic gates and circuitry) within the modem subsystem 1012.

The channel occupancy module 1008 may communicate with one or more components of BS 1000 to implement various aspects of the present disclosure, for example, aspects of FIGS. 3-8. For example, the channel occupancy module 1008 may be configured to monitor, in a shared frequency band in a plurality of beam directions, for signals associated with one or more wireless networks different from the first wireless network. The channel occupancy module 1008 may be configured to monitor for the signals by: detecting, in the shared frequency band and in at least a first beam direction of the plurality of beam directions, a first signal associated with a second wireless network; and updating a channel occupancy list to indicate that at least a portion of the shared frequency band is occupied in at least the first beam direction. The channel occupancy module 1008 may be configured to cause the transceiver 1010 to transmit, in the shared frequency band, a second signal in a second beam direction of the plurality of beam directions based on the channel occupancy list.

In some aspects, the channel occupancy module 1008 is configured to transmit the second signal and the second beam direction different from the first beam direction. In some aspects, the channel occupancy module 1008 is configured to detect the shared frequency band in two or more beam directions of the plurality of beam directions, a plurality of signals associated with the one or more wireless networks, the plurality of signals comprising the first signal. In some aspects, the channel occupancy module 1008 is configured to update the channel occupancy list to indicate that at least the portion of the shared frequency band is occupied in the two or more beam directions of the plurality of beam directions. In some aspects, the channel occupancy module 1008 is configured to cause the transceiver 1010 to transmit, in the first beam direction, the second signal using at least one of a transmit power or a duty cycle, wherein the at least one of the transmit power or the duty cycle is reduced from a first value based on detecting the first signal in the first beam direction.

In some aspects, the channel occupancy module 1008 is configured to detect, in the shared frequency band in two or more beam directions of the plurality of beam directions, two or more signals associated with the one or more wireless networks, a plurality signals comprising the first signal. In some aspects, the channel occupancy module 1008 is configured to update the channel occupancy list to indicate that at least the portion of the shared frequency band is occupied in the two or more beam directions. In some aspects, the channel occupancy module 1008 is configured to transmit the second signal based on at least one of a number of the two more beam directions or a number of available beam directions of the plurality of beam directions satisfying a threshold.

In some aspects, the channel occupancy module 1008 is configured to select the plurality of beam directions based on scheduled data traffic. In some aspects, the channel occupancy module 1008 is configured to monitor for the signals in the plurality of beam directions based on a beam pattern. In some aspects, the channel occupancy module 1008 is configured to monitor for the signals in each beam direction of the plurality of beam directions for a contiguous time period. In some aspects, the channel occupancy module 1008 is configured to: monitor for the signals in the plurality of beam directions based on a beam pattern; and monitor for the signals in each beam direction of the plurality of beam directions for a plurality of non-contiguous time periods.

As shown, the transceiver 1010 may include the modem subsystem 1012 and the RF unit 1014. The transceiver 1010 can be configured to communicate bi-directionally with other devices, such as the UEs 115, 215, 313, 813, and/or 900 and/or another core network element. The modem subsystem 1012 may be configured to modulate and/or encode data according to a MCS, e.g., a LDPC coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data (e.g., RRC configurations, SPS configurations, activations, reactivations, and releases, and PDSCH data, DCI) from the modem subsystem 1012 (on outbound transmissions) or of transmissions originating from another source such as a UE 115 and/or UE 900. The RF unit 1014 may be further configured to perform analog beamforming in conjunction with the digital beamforming. Although shown as integrated together in transceiver 1010, the modem subsystem 1012 and/or the RF unit 1014 may be separate devices that are coupled together at the BS 1000 to enable the BS 1000 to communicate with other devices.

The RF unit 1014 may provide the modulated and/or processed data, e.g. data packets (or, more generally, data messages that may contain one or more data packets and other information), to the antennas 1016 for transmission to one or more other devices. The antennas 1016 may further receive data messages transmitted from other devices and provide the received data messages for processing and/or demodulation at the transceiver 1010. The transceiver 1010 may provide the demodulated and decoded data (e.g., HARQ ACK/NACK, etc.) to the channel occupancy module 1008 for processing. The antennas 1016 may include multiple antennas of similar or different designs in order to sustain multiple transmission links.

In an example, the transceiver 1010 is configured to communicate with one or more components of the BS 1000, such as the channel occupancy module 1008, to receive signal energy while monitoring for channel occupancy, and/or to transmit signals or communications in one or more beam directions based on the monitoring.

In an aspect, the BS 1000 can include multiple transceivers 1010 implementing different RATs (e.g., NR and LTE). In an aspect, the BS 1000 can include a single transceiver 1010 implementing multiple RATs (e.g., NR and LTE). In an aspect, the transceiver 1010 can include various components, where different combinations of components can implement different RATs.

Figure 11:
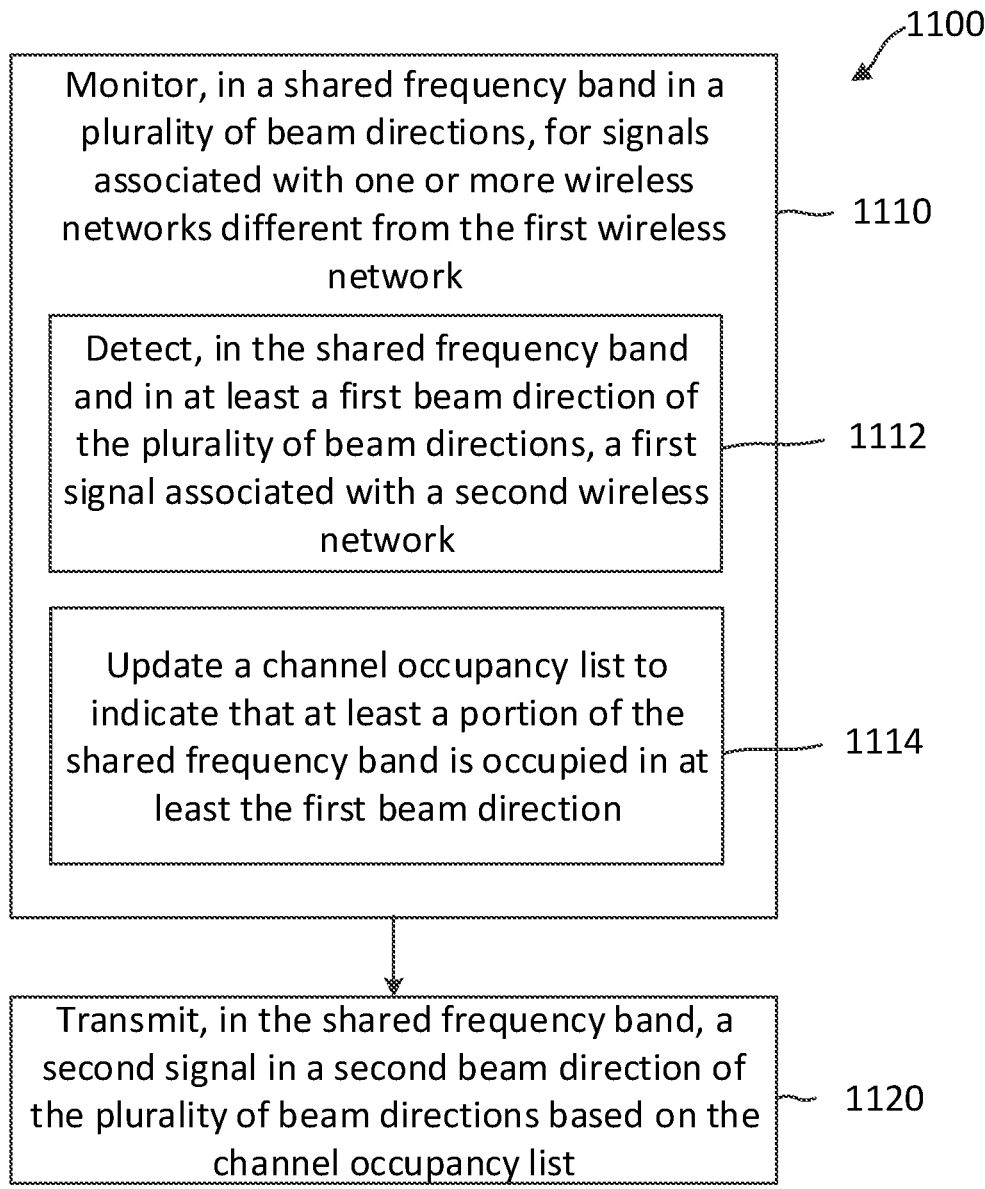
FIG. 11 is a flow diagram of a communication method according to some aspects of the present disclosure.

FIG. 11 is a flow diagram illustrating a communication method 1100 according to some aspects of the present disclosure. Aspects of the method 1100 can be executed by a computing device (e.g., a processor, processing circuit, and/or other suitable component) of a wireless communication device or other suitable means for performing the steps. For example, a wireless communication device, such as a BS 105 or the BS 1000, may utilize one or more components, such as the processor 1002, the memory 1004, the channel occupancy module 1008, the transceiver 1010, the modem 1012, and the one or more antennas 1016, to execute the steps of method 1100. The method 1100 may employ similar mechanisms as described in FIGS. 3-7C. As illustrated, the method 1100 includes a number of enumerated steps, but aspects of the method 1100 may include additional steps before, after, and in between the enumerated steps. In some aspects, one or more of the enumerated steps may be omitted or performed in a different order.

At block 1110, the BS monitors, in a shared frequency band in a plurality of beam directions, for signals associated with one or more wireless networks different from the first wireless network. The monitoring may occur during a sensing window. The signals may be associated with network traffic from one or more other networks. The BS may be preconfigured with the parameters for the monitoring, such as the specific time and frequency resources associated with the sensing window. The monitoring may include obtaining signal measurements during the sensing window, comparing the signal measurements to a threshold, and/or performing a cross-correlation of a signal received in the sensing window and a known waveform, sequence, or pattern. For example, if the cross-correlation value exceeds a threshold, the BS determines that the channel occupancy signal has been detected. The monitoring may be periodic such that the BS monitors for the channel occupancy signal at predetermined time intervals and for predetermined durations. Monitoring for the channel occupancy signal may include refraining from transmitting and or receiving during the sensing window.

The BS may use beamforming to monitor for the channel occupancy signal in each of a plurality of beam directions. The beamforming may include selectively activating individual antenna elements and groups of antenna elements of an antenna array (e.g., MIMO), and adjusting the gain and phase of the signals provided by each antenna element to focus on each of a plurality of receive beam directions. The monitoring may be performed according to a beam pattern, such as a beam sweeping pattern in which the BS uses beamforming to sweep across a plurality of receive beam directions. The BS may monitor for the channel occupancy signal in a plurality of sensing windows separated by a channel occupancy sensing period or interval. In some aspects, the BS may utilize one or more components, such as the processor 1002, the memory 1004, the channel occupancy module 1008, the transceiver 1010, the modem 1012, and the one or more antennas 1016, to perform the operations at block 1110.

The operations of block 1110 include the operations of blocks 1112 and 1114. In this regard, at block 1112, which comprises a portion or sub-step of the operations of block 1110, the BS detects, in the shared frequency band and in at least a first beam direction of the plurality of beam directions, a first signal associated with a second wireless network. Detecting the signal may include performing signal measurements and/or signal detection (cross-correlation) during the sensing window, comparing the signal measurements to a threshold, and/or comparing a cross-correlation value to a signal detection threshold. In some aspects, the detection of the signal is based on the measured energy. For example, the BS may compare the measured energy to a signal threshold. If the measured energy exceeds the threshold, the BS determines that a signal has been detected. In some aspects, the BS may utilize one or more components, such as the processor 1002, the memory 1004, the channel occupancy module 1008, the transceiver 1010, the modem 1012, and the one or more antennas 1016, to perform the operations at block 1112.

At block 1114, the BS updates a channel occupancy list to indicate that at least a portion of the shared frequency band is occupied in at least the first beam direction. The channel occupancy list is updated to indicate the beam direction(s) and frequency bands/subbands associated with the signal. For example, if the BS detects a signal in a first beam direction, and in a first frequency subband, the BS may update the channel occupancy list to indicate that at least the first frequency subband is occupied in at least the first beam direction. If the BS subsequently detects a further signal in a second beam direction and in a second frequency subband, the BS again updates the channel occupancy list to indicate that at least the second frequency subband is occupied in at least the second beam direction. In some aspects, the first BS 303a may store the NOL in a memory (e.g., the memory 1004 of FIG. 10) at the first BS 303a In some aspects, the BS may utilize one or more components, such as the processor 1002, the memory 1004, the channel occupancy module 1008, the transceiver 1010, the modem 1012, and the one or more antennas 1016, to perform the operations at block 1114.

At block 1120, the BS transmits, in the shared frequency band, a second signal in a second beam direction of the plurality of beam directions based on the channel occupancy list. In some aspects, block 1120 includes backing off of the shared frequency band in one or more beam directions based on the channel occupancy list, and may include continuing to communicate in the shared frequency band in one or more beam directions. In some aspects the BS may back off an entire bandwidth of the shared radio frequency band associated with the sensing window, or may back off of specific subbands of the shared radio frequency band. In this regard, the signal may span only a portion of the frequency band during the sensing window. In some aspects, the BS may back off of those subbands in which the signal is detected. In other aspects, the BS determines whether to back off of the entire shared radio frequency band by comparing the total detected energy in the sensing window, or the number of beams or instances of the signal to a threshold. Backing off of the shared radio frequency band may include refraining from communicating on the shared radio frequency band, including transmitting and/or receiving on the shared radio frequency band.

In some aspects, the BS may not back off of the shared channel in the detected beam directions altogether, but may continue communicating in the shared frequency band and in the detected beam directions, but with reduced transmit power and/or duty cycle without completely surrendering the channel resources. Using a reduced transmit power and/or duty cycle can reduce the amount of interference to the other network having ongoing transmissions in the shared frequency band. Communicating in an occupied channel and beam direction with reduced transmit power and/or duty cycle. In some aspects, the BS device may utilize one or more components, such as the processor 1002, the memory 1004, the channel occupancy module 1008, the transceiver 1010, the modem 1012, and the one or more antennas 1016, to perform the operations at block 1120.

In some aspects, the transmitting the second signal includes transmitting the second signal and the second beam direction different from the first beam direction. In some aspects, the monitoring includes: detecting, the shared frequency band in two or more beam directions of the plurality of beam directions, a plurality of signals associated with the one or more wireless networks, the plurality of signals comprising the first signal. In some aspects, the updating the channel occupancy list includes: updating the channel occupancy list to indicate that at least the portion of the shared frequency band is occupied in the two or more beam directions of the plurality of beam directions. In some aspects, the second beam direction corresponds to the first beam direction, and the transmitting the second signal includes: transmitting, in the first beam direction, the second signal using at least one of a transmit power or a duty cycle, wherein the at least one of the transmit power or the duty cycle is reduced from a first value based on detecting the first signal in the first beam direction.

In some aspects, the monitoring comprises: detecting, the shared frequency band in two or more beam directions of the plurality of beam directions, two or more signals associated with the one or more wireless networks, a plurality signals comprising the first signal. In some aspects, the updating the channel occupancy list includes updating the channel occupancy list to indicate that at least the portion of the shared frequency band is occupied in the two or more beam directions. In some aspects, the transmitting the second signal is further based on at least one of a number of the two more beam directions or a number of available beam directions of the plurality of beam directions satisfying a threshold. In some aspects, the method 1100 further includes selecting the plurality of beam directions based on scheduled data traffic. In some aspects, the monitoring includes: monitoring for the signals in the plurality of beam directions based on a beam pattern; and monitoring for the signals in each beam direction of the plurality of beam directions for a contiguous time period. In some aspects, the monitoring includes: monitoring for the signals in the plurality of beam directions based on a beam pattern; and monitoring for the signals in each beam direction of the plurality of beam directions for a plurality of non-contiguous time periods.

Figure 12:
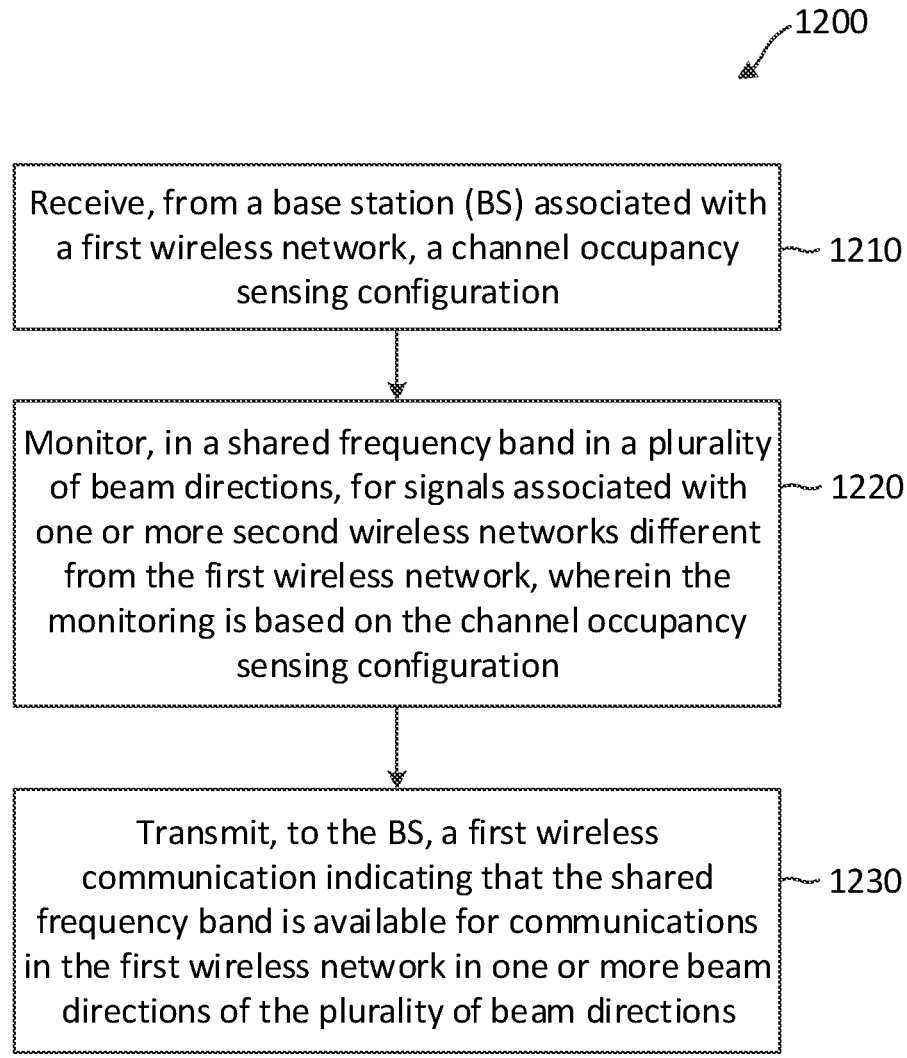
FIG. 12 is a flow diagram of a communication method according to some aspects of the present disclosure.

FIG. 12 is a flow diagram illustrating a communication method 1200 according to some aspects of the present disclosure. Aspects of the method 1200 can be executed by a computing device (e.g., a processor, processing circuit, and/or other suitable component) of a wireless communication device or other suitable means for performing the steps. For example, a wireless communication device, such as a UE 115 or UE 900, may utilize one or more components, such as the processor 902, the memory 1004, the channel occupancy module 908, the transceiver 910, the modem 912, and the one or more antennas 916, to execute the steps of method 1200. The method 1200 may employ similar mechanisms as described in FIGS. 3-7C. As illustrated, the method 1200 includes a number of enumerated steps, but aspects of the method 1200 may include additional steps before, after, and in between the enumerated steps. In some aspects, one or more of the enumerated steps may be omitted or performed in a different order.

At block 1210, the UE receives, from a base station (BS) associated with a first wireless network, a channel occupancy sensing configuration. The channel occupancy sensing configuration may indicate a plurality of parameters for channel occupancy sensing, such as a channel occupancy sensing period, a signal threshold, a beam pattern, or any other suitable channel occupancy sensing parameter described herein. For example, the sensing configuration may indicate a minimum sensing period for each beam direction of the plurality of beam directions and/or a number of sensing occasions for each beam direction. The UE may be configured to receive the channel occupancy sensing configuration in an RRC message, in a system information block (SIB), or any other suitable mechanism. In some aspects, the UE may utilize one or more components, such as the processor 902, the memory 904, the channel occupancy module 908, the transceiver 910, the modem 912, and the one or more antennas 916, to perform the operations at block 1210.

At block 1220, the UE monitors, in a shared frequency band in a plurality of beam directions, for signals associated with one or more second wireless networks different from the first wireless network, wherein the monitoring is based on the channel occupancy sensing configuration. The monitoring may occur during a sensing window. The signals may be associated with network traffic from one or more other networks. The UE may be preconfigured with the parameters for the monitoring, such as the specific time and frequency resources associated with the sensing window. The monitoring may include obtaining signal measurements during the sensing window, comparing the signal measurements to a threshold, and/or performing a cross-correlation of a signal received in the sensing window and a known waveform, sequence, or pattern. For example, if the cross-correlation value exceeds a threshold, the UE determines that the channel occupancy signal has been detected. The monitoring may be periodic such that the UE monitors for the channel occupancy signal at predetermined time intervals and for predetermined durations. Monitoring for the channel occupancy signal may include refraining from transmitting and or receiving during the sensing window.

The UE may use beamforming to monitor for the channel occupancy signal in each of a plurality of beam directions. The beamforming may include selectively activating individual antenna elements and groups of antenna elements of an antenna array (e.g., MIMO), and adjusting the gain and phase of the signals provided by each antenna element to focus on each of a plurality of receive beam directions. The monitoring may be performed according to a beam pattern, such as a beam sweeping pattern in which the UE uses beamforming to sweep across a plurality of receive beam directions. The UE may monitor for the channel occupancy signal in a plurality of sensing windows separated by a channel occupancy sensing period or interval. In some aspects, the wireless communication device may utilize one or more components, such as the processor 902, the memory 1004, the channel occupancy module 908, the transceiver 910, the modem 912, and the one or more antennas 916, to perform the operations at block 1220.

At block 1230, the UE transmits, to the BS, a first wireless communication indicating that the shared frequency band is available for communications in the first wireless network in one or more beam directions of the plurality of beam directions. In some aspects, the wireless communication device may utilize one or more components, such as the processor 902, the memory 1004, the channel occupancy module 908, the transceiver 910, the modem 912, and the one or more antennas 916, to perform the operations at block 1230.

In some aspects, the channel occupancy sensing configuration includes a plurality of dynamic frequency selection (DFS) sensing parameters. In some aspects, the DFS sensing parameters include one or more of a silencing interval configuration or a minimum channel sensing time. In some aspects, the UE receiving the channel occupancy sensing configuration includes the UE receiving a system information block (SIB) message comprising the channel occupancy sensing configuration. In some aspects, the UE monitoring for the signals associated with the one or more wireless networks includes the UE monitoring for the signals associated with the one or more wireless networks during an initial access procedure. In some aspects, the UE receiving the channel occupancy configuration includes the UE receiving a radio resource control (RRC) configuration comprising the channel occupancy sensing configuration. In some aspects, the method 1200 further includes the UE monitoring, before receiving the RRC configuration, for the signals associated with the second wireless network in each beam direction of the plurality of beam directions based on a preconfigured channel sensing configuration. In some aspects, the UE monitoring for the signals associated with the second wireless network includes the UE initiating, in response to receiving the RRC configuration, the monitoring for the signals associated with the second wireless network. In some aspects, the UE transmitting the first wireless communication includes the UE transmitting, in a first beam direction of the one or more beam directions, a physical random access channel (PRACH) signal based on the first beam direction being available for communications. In some aspects, the transmitting the first wireless communication includes transmitting a report indicating that a first beam direction of the one or more beam directions is available for communication. In some aspects, the transmitting the report includes transmitting a physical uplink control channel (PUCCH) signal or a physical uplink share channel (PUSCH) signal indicating that the one or more beam directions are available for communication.

Further aspects of the present disclosure include the following:

1. A method of wireless communication performed by a base station (BS) associated with a first wireless network, the method comprising:
    monitoring, in a shared frequency band in a plurality of beam directions, for signals associated with one or more wireless networks different from the first wireless network, wherein the monitoring comprises:
        detecting, in the shared frequency band and in at least a first beam direction of the plurality of beam directions, a first signal associated with a second wireless network; and
        updating a channel occupancy list to indicate that at least a portion of the shared frequency band is occupied in at least the first beam direction; and
    transmitting, in the shared frequency band, a second signal in a second beam direction of the plurality of beam directions based on the channel occupancy list.

2. The method of clause 1, wherein the transmitting the second signal comprises:
    transmitting the second signal in the second beam direction different from the first beam direction.

3. The method of clause 1,
wherein the monitoring comprises:
    detecting, the shared frequency band in two or more beam directions of the plurality of beam directions, a plurality of signals associated with the one or more wireless networks, the plurality of signals comprising the first signal,
    wherein the updating the channel occupancy list comprises:
updating the channel occupancy list to indicate that at least the portion of the shared frequency band is occupied in the two or more beam directions of the plurality of beam directions,
wherein the second beam direction corresponds to the first beam direction, and
    wherein the transmitting the second signal comprises:
transmitting, in the first beam direction, the second signal using at least one of a transmit power or a duty cycle, wherein the at least one of the transmit power or the duty cycle is reduced from a first value based on detecting the first signal in the first beam direction.

4. The method of clause 1,
wherein the monitoring comprises:
    detecting, the shared frequency band in two or more beam directions of the plurality of beam directions, two or more signals associated with the one or more wireless networks, a plurality signals comprising the first signal,
    wherein the updating the channel occupancy list comprises:
updating the channel occupancy list to indicate that at least the portion of the shared frequency band is occupied in the two or more beam directions, and
wherein the transmitting the second signal is further based on at least one of a number of the two more beam directions or a number of available beam directions of the plurality of beam directions satisfying a threshold.

5. The method of any of clauses 1-4, further comprising:
    selecting the plurality of beam directions based on scheduled data traffic.

6. The method of any of clauses 1-5, wherein the monitoring comprises:
    monitoring for the signals in the plurality of beam directions based on a beam pattern; and
    monitoring for the signals in each beam direction of the plurality of beam directions for a contiguous time period.

7. The method of any of clauses 1-5, wherein the monitoring comprises:
    monitoring for the signals in the plurality of beam directions based on a beam pattern; and
    monitoring for the signals in each beam direction of the plurality of beam directions for a plurality of non-contiguous time periods.

8. A method of wireless communication performed by a user equipment (UE), the method comprising:
    receiving, from a base station (BS) associated with a first wireless network, a channel occupancy sensing configuration;
    monitoring, in a shared frequency band in a plurality of beam directions, for signals associated with one or more second wireless networks different from the first wireless network, wherein the monitoring is based on the channel occupancy sensing configuration; and
    transmitting, to the BS, a first wireless communication indicating that the shared frequency band is available for communications in the first wireless network in one or more beam directions of the plurality of beam directions.

9. The method of clause 8, wherein the channel occupancy sensing configuration comprises a plurality of dynamic frequency selection (DFS) sensing parameters.

10. The method of clause 9, wherein the DFS sensing parameters comprise one or more of a silencing interval configuration or a minimum channel sensing time.

11. The method of any of clauses 8-10, wherein receiving the channel occupancy sensing configuration comprises receiving a system information block (SIB) message comprising the channel occupancy sensing configuration.

12. The method of clause 11, wherein the monitoring comprises:
    monitoring for the signals associated with the one or more wireless networks during an initial access procedure.

13. The method of any of clauses 8-10, wherein the receiving the channel occupancy configuration comprises receiving a radio resource control (RRC) configuration comprising the channel occupancy configuration.

14. The method of clause 13, wherein the method further comprises:
monitoring, before receiving the RRC configuration, for the signals associated with the second wireless network in each beam direction of the plurality of beam directions based on a preconfigured channel sensing configuration.

15. The method of clause 13, wherein the monitoring for the signals associated with the second wireless network comprises:
initiating, in response to receiving the RRC configuration, the monitoring for the signals associated with the second wireless network.

16. The method of any of clauses 8-15, wherein the transmitting the first wireless communication comprises:
transmitting, in a first beam direction of the one or more beam directions, a physical random access channel (PRACH) signal based on the first beam direction being available for communications.

17. The method of any of clauses 8-16, wherein the transmitting the first wireless communication comprises:
transmitting a report indicating that a first beam direction of the one or more beam directions is available for communication.

18. The method of clause 17, wherein the transmitting the report comprises:
transmitting a physical uplink control channel (PUCCH) signal or a physical uplink shared channel (PUSCH) signal indicating that the one or more beam directions are available for communication.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a base station (BS) associated with a first wireless network, the method comprising:
monitoring, in a shared frequency band in a plurality of beam directions, for signals associated with one or more wireless networks different from the first wireless network, wherein the monitoring comprises:
detecting, in the shared frequency band and in at least a first beam direction of the plurality of beam directions, a first signal associated with a second wireless network; and
updating a channel occupancy list to indicate that at least a portion of the shared frequency band is occupied in at least the first beam direction; and
transmitting, in the shared frequency band, a second signal in a second beam direction of the plurality of beam directions based on the channel occupancy list.

2. The method of claim 1, wherein the transmitting the second signal comprises:
transmitting the second signal in the second beam direction different from the first beam direction.

3. The method of claim 1,
wherein the monitoring comprises:
detecting, the shared frequency band in two or more beam directions of the plurality of beam directions, a plurality of signals associated with the one or more wireless networks, the plurality of signals comprising the first signal,
wherein the updating the channel occupancy list comprises:
updating the channel occupancy list to indicate that at least the portion of the shared frequency band is occupied in the two or more beam directions of the plurality of beam directions,
wherein the second beam direction corresponds to the first beam direction, and
wherein the transmitting the second signal comprises:
transmitting, in the first beam direction, the second signal using at least one of a transmit power or a duty cycle, wherein the at least one of the transmit power or the duty cycle is reduced from a first value based on detecting the first signal in the first beam direction.

4. The method of claim 1,
wherein the monitoring comprises:
detecting, the shared frequency band in two or more beam directions of the plurality of beam directions, two or more signals associated with the one or more wireless networks, a plurality signals comprising the first signal, wherein the updating the channel occupancy list comprises:
    updating the channel occupancy list to indicate that at least the portion of the shared frequency band is occupied in the two or more beam directions, and
wherein the transmitting the second signal is further based on at least one of a number of the two more beam directions or a number of available beam directions of the plurality of beam directions satisfying a threshold.

5. The method of claim 1, further comprising:
selecting the plurality of beam directions based on scheduled data traffic.

6. The method of claim 1, wherein the monitoring comprises:
    monitoring for the signals in the plurality of beam directions based on a beam pattern; and
    monitoring for the signals in each beam direction of the plurality of beam directions for a contiguous time period.

7. The method of claim 1, wherein the monitoring comprises:
    monitoring for the signals in the plurality of beam directions based on a beam pattern; and
    monitoring for the signals in each beam direction of the plurality of beam directions for a plurality of non-contiguous time periods.

8. A method of wireless communication performed by a user equipment (UE), the method comprising:
    receiving, from a base station (BS) associated with a first wireless network, a channel occupancy sensing configuration;
    monitoring, in a shared frequency band in a plurality of beam directions, for signals associated with one or more second wireless networks different from the first wireless network, wherein the monitoring is based on the channel occupancy sensing configuration; and
    transmitting, to the BS, a first wireless communication indicating that the shared frequency band is available for communications in the first wireless network in one or more beam directions of the plurality of beam directions.

9. The method of claim 8, wherein the channel occupancy sensing configuration comprises a plurality of dynamic frequency selection (DFS) sensing parameters, and wherein the DFS sensing parameters comprise one or more of a silencing interval configuration or a minimum channel sensing time.

10. The method of claim 8, wherein the receiving the channel occupancy sensing configuration comprises receiving a system information block (SIB) message comprising the channel occupancy sensing configuration, wherein the monitoring comprises:
    monitoring for the signals associated with the one or more wireless networks during an initial access procedure.

11. The method of claim 8, wherein the receiving the channel occupancy sensing configuration comprises receiving a radio resource control (RRC) configuration comprising the channel occupancy sensing configuration.

12. The method of claim 11, wherein the method further comprises:
    monitoring, before receiving the RRC configuration, for the signals associated with the one or more second wireless networks in each beam direction of the plurality of beam directions based on a preconfigured channel sensing configuration.

13. The method of claim 11, wherein the monitoring for the signals associated with the one or more second wireless networks comprises:
    initiating, in response to receiving the RRC configuration, the monitoring for the signals associated with the one or more second wireless networks.

14. The method of claim 8, wherein the transmitting the first wireless communication comprises:
    transmitting, in a first beam direction of the one or more beam directions, a physical random access channel (PRACH) signal based on the first beam direction being available for communications.

15. The method of claim 8, wherein the transmitting the first wireless communication comprises:
    transmitting a report indicating that a first beam direction of the one or more beam directions is available for communication, and
    wherein the transmitting the report comprises:
        transmitting a physical uplink control channel (PUCCH) signal or a physical uplink shared channel (PUSCH) signal indicating that the one or more beam directions are available for communication.

16. A base station (BS) associated with a first wireless network, the BS comprising:
    a processor configured to:
        monitor, in a shared frequency band in a plurality of beam directions, for signals associated with one or more wireless networks different from the first wireless network, wherein the processor configured to monitor comprises:
            detect, in the shared frequency band and in at least a first beam direction of the plurality of beam directions, a first signal associated with a second wireless network; and
        update a channel occupancy list to indicate that at least a portion of the shared frequency band is occupied in at least the first beam direction; and
    a transceiver configured to:
        transmit, in the shared frequency band, a second signal in a second beam direction of the plurality of beam directions based on the channel occupancy list.

17. The BS of claim 16, wherein the transceiver configured to transmit the second signal comprises the transceiver configured to:
    transmit the second signal in the second beam direction different from the first beam direction.

18. The BS of claim 16,
    wherein the processor configured to monitor comprises the processor configured to:
        detect, the shared frequency band in two or more beam directions of the plurality of beam directions, a plurality of signals associated with the one or more wireless networks, the plurality of signals comprising the first signal,
    wherein the processor configured to update the channel occupancy list comprises the processor configured to:
        update the channel occupancy list to indicate that at least the portion of the shared frequency band is occupied in the two or more beam directions of the plurality of beam directions,
    wherein the second beam direction corresponds to the first beam direction, and
    wherein the transceiver configured to transmit the second signal comprises the transceiver configured to:
        transmit, in the first beam direction, the second signal using at least one of a transmit power or a duty cycle, wherein the at least one of the transmit power or the duty cycle is reduced from a first value based on detecting the first signal in the first beam direction.

19. The BS of claim 16,
wherein the processor configured to monitor comprises the processor configured to:
  detect, the shared frequency band in two or more beam directions of the plurality of beam directions, two or more signals associated with the one or more wireless networks, a plurality signals comprising the first signal,
wherein the processor configured to update the channel occupancy list comprises the processor configured to:
  update the channel occupancy list to indicate that at least the portion of the shared frequency band is occupied in the two or more beam directions, and
wherein the transceiver is configured to transmit the second signal further based on at least one of a number of the two more beam directions or a number of available beam directions of the plurality of beam directions satisfying a threshold.

20. The BS of claim 16, wherein the processor is further configured to:
  select the plurality of beam directions based on scheduled data traffic.

21. The BS of claim 16, wherein the processor configured to monitor comprises the processor configured to:
  monitor for the signals in the plurality of beam directions based on a beam pattern; and
  monitor for the signals in each beam direction of the plurality of beam directions for a contiguous time period.

22. The BS of claim 16, wherein the processor configured to monitor comprises the processor configured to:
  monitor for the signals in the plurality of beam directions based on a beam pattern; and
  monitor for the signals in each beam direction of the plurality of beam directions for a plurality of non-contiguous time periods.

23. A user equipment (UE), comprising:
a transceiver configured to:
  receive, from a base station (BS) associated with a first wireless network, a channel occupancy sensing configuration; and
a processor configured to:
  monitor, in a shared frequency band in a plurality of beam directions, for signals associated with one or more second wireless networks different from the first wireless network, wherein the processor configured to monitor is based on the channel occupancy sensing configuration,
wherein the transceiver is further configured to:
  transmit, to the BS, a first wireless communication indicating that the shared frequency band is available for communications in the first wireless network in one or more beam directions of the plurality of beam directions.

24. The UE of claim 23, wherein the channel occupancy sensing configuration comprises a plurality of dynamic frequency selection (DFS) sensing parameters, wherein the DFS sensing parameters comprise one or more of a silencing interval configuration or a minimum channel sensing time.

25. The UE of claim 23, wherein the transceiver configured to receive the channel occupancy sensing configuration comprises the transceiver configured to:
  receive a system information block (SIB) message comprising the channel occupancy sensing configuration, and
wherein the processor configured to monitor comprises the processor configured to:
  monitor for the signals associated with the one or more wireless networks during an initial access procedure.

26. The UE of claim 23, wherein the transceiver configured to receive the channel occupancy sensing configuration comprises the transceiver configured to:
  receive a radio resource control (RRC) configuration comprising the channel occupancy sensing configuration.

27. The UE of claim 26, wherein the processor is further configured to:
  monitor, before receiving the RRC configuration, for the signals associated with the one or more second wireless networks in each beam direction of the plurality of beam directions based on a preconfigured channel sensing configuration.

28. The UE of claim 26, wherein the processor configured to monitor for the signals associated with the one or more second wireless networks comprises the processor configured to:
  initiate, in response to receiving the RRC configuration, the monitoring for the signals associated with the one or more second wireless networks.

29. The UE of claim 23, wherein the transceiver configured to transmit the first wireless communication comprises the transceiver configured to:
  transmit, in a first beam direction of the one or more beam directions, a physical random access channel (PRACH) signal based on the first beam direction being available for communications.

30. The UE of claim 23, wherein the transceiver configured to transmit the first wireless communication comprises the transceiver configured to:
  transmit a report indicating that a first beam direction of the one or more beam directions is available for communication.

* * * * *